US006744728B1

(12) United States Patent
Chung

(10) Patent No.: US 6,744,728 B1
(45) Date of Patent: Jun. 1, 2004

(54) DATA PIPELINE TIMING OPTIMIZATION TECHNIQUE IN A MULTI-PORT BRIDGE FOR A LOCAL AREA NETWORK

(75) Inventor: David Chung, Sunnyvale, CA (US)

(73) Assignee: Sony Corporation & Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/273,134

(22) Filed: Mar. 19, 1999

Related U.S. Application Data

(63) Continuation-in-part of application No. 09/050,750, filed on Mar. 30, 1998.
(60) Provisional application No. 60/059,171, filed on Sep. 17, 1997.

(51) Int. Cl.[7] .............................. H04J 3/14; H04L 12/56
(52) U.S. Cl. ....................................... 370/229; 370/401
(58) Field of Search ........................ 370/229, 230–235, 370/389, 392, 400, 401

(56) References Cited

U.S. PATENT DOCUMENTS

| 3,735,357 | A | 5/1973 | Maholick et al. ......... 340/172.5 |
| 4,213,201 | A | 7/1980 | Gagnier et al. ................. 370/62 |
| 4,589,120 | A | 5/1986 | Mendala ..................... 375/117 |
| 4,597,078 | A | 6/1986 | Kempf ......................... 370/94 |

(List continued on next page.)

FOREIGN PATENT DOCUMENTS

| EP | 0 397 188 A2 | 11/1990 | ........... H04L/12/46 |
| EP | 0597789 A1 | 5/1994 | ........... H04L/12/46 |
| EP | 0 609 626 A2 | 8/1994 | ........... H04L/12/50 |
| EP | 0642246 A2 | 3/1995 | ........... H04L/29/06 |

(List continued on next page.)

OTHER PUBLICATIONS

Bob Stewart and Bill Hawe, "Local Area Network Applications," Telecommunications, North American Edition, Sep. 1984, pp. 96f–96j, and 96u.

Bob Stewart, Bill Hawe, and Alan Kirby, "Local Area Network Connection," Telecommunications, North American Edition, Sep. 1984, pp. 54–55,58–59 and 66.

National Semiconductor, databook, "DP83934 SONIC™–T Systems–Oriented Network Interface Controller with Twisted Pair Interface" pp. 1–457 to 1–458, 1–468 to 1–477, 1–480, 1–512– to 1–529.

(List continued on next page.)

*Primary Examiner*—Chau Nguyen
*Assistant Examiner*—Soon-Dong Hyun
(74) *Attorney, Agent, or Firm*—Haverstock & Owens LLP

(57) ABSTRACT

A method of optimizing a data path in a multi-port bridge for a local area network (LAN) includes steps of: identifying a data path through the multi-port bridge wherein the data path includes a plurality of stages in a serial arrangement, wherein each stage performs a corresponding operation on data received from the LAN by the multi-port bridge; identifying a stage in the data path wherein the identified stage requires a period of time to perform its corresponding operation which is longer than any other stage; and subdividing the identified stage into two or more subdivided stages wherein the operations performed by the subdivided stages collectively perform the operation associated with the identified stage and wherein each of the two or more subdivided stages requires a period of time to perform its corresponding operation which is shorter than the period of time required for the identified stage to perform its corresponding operation. The method can include determining a bandwidth required for the multi-port bridge; and determining a frequency for a clock signal based upon the bandwidth. The method can also include repeatedly subdividing selected stages until a slowest stage in the data path is operable according to the clock signal. The invention results in a beneficial trade-off in which bandwidth for the multi-port bridge and latency are both increased.

8 Claims, 22 Drawing Sheets

U.S. PATENT DOCUMENTS

| | | | |
|---|---|---|---|
| 4,627,052 A | 12/1986 | Hoare et al. | 370/88 |
| 4,706,081 A | 11/1987 | Hart et al. | 340/825.03 |
| 4,707,827 A | 11/1987 | Bione et al. | 370/85 |
| 4,710,769 A | 12/1987 | Friedman et al. | 340/825.03 |
| 4,715,030 A | 12/1987 | Koch et al. | 370/85 |
| 4,718,060 A | 1/1988 | Oguchi et al. | 370/85 |
| 4,723,311 A | 2/1988 | Moustakas et al. | 455/612 |
| 4,727,537 A | 2/1988 | Nichols | 370/85 |
| 4,727,538 A | 2/1988 | Furchtgott et al. | 370/85 |
| 4,737,953 A | 4/1988 | Koch et al. | 370/94 |
| 4,744,078 A | 5/1988 | Kowalczyk | 370/85 |
| 4,797,879 A | 1/1989 | Habbab et al. | 370/3 |
| H586 H | 2/1989 | Kun | 370/94 |
| 4,823,338 A | 4/1989 | Chan et al. | 370/85 |
| 4,849,962 A | 7/1989 | Morimoto et al. | 370/29 |
| 4,878,216 A | 10/1989 | Yunoki | 370/60 |
| 4,901,308 A | 2/1990 | Deschaine | 370/58.1 |
| 4,905,219 A | 2/1990 | Barr et al. | 370/4 |
| 4,933,937 A | 6/1990 | Konishi | 370/85.13 |
| 4,935,922 A | 6/1990 | Wicklund et al. | 370/60 |
| 4,962,497 A | 10/1990 | Ferenc et al. | 370/60.1 |
| RE33,426 E | 11/1990 | Sugimoto et al. | 370/85.14 |
| 5,016,159 A | 5/1991 | Maruyama | 364/200 |
| 5,020,052 A | 5/1991 | DePrycker et al. | 370/60 |
| 5,027,350 A | 6/1991 | Marshall | 370/85.13 |
| 5,048,014 A | 9/1991 | Fischer | 370/85.5 |
| 5,107,489 A | 4/1992 | Brown et al. | 370/58.2 |
| 5,119,367 A | 6/1992 | Kawakatsu et al. | 370/54 |
| 5,140,585 A | 8/1992 | Tomikawa | 370/60.1 |
| 5,151,897 A | 9/1992 | Suzuki | 370/85.13 |
| 5,151,994 A | 9/1992 | Wille et al. | 395/800 |
| 5,166,926 A | 11/1992 | Cisneros et al. | 370/60 |
| 5,184,346 A | 2/1993 | Kozaki et al. | 370/60 |
| 5,214,646 A * | 5/1993 | Yacoby | 370/402 |
| 5,229,993 A | 7/1993 | Foudriat et al. | 370/85.3 |
| 5,241,550 A | 8/1993 | Kusano | 371/71 |
| 5,243,699 A | 9/1993 | Nickolls et al. | 395/275 |
| 5,274,631 A | 12/1993 | Bhardwaj | 370/60 |
| 5,307,345 A | 4/1994 | Lozowick et al. | 370/61 |
| 5,339,316 A | 8/1994 | Diepstraten | 370/85.13 |
| 5,353,353 A | 10/1994 | Vijeh et al. | 380/29 |
| 5,379,289 A | 1/1995 | DeSouza et al. | 370/85.13 |
| 5,379,296 A | 1/1995 | Johnson et al. | 370/60 |
| 5,386,413 A | 1/1995 | McAuley et al. | 370/54 |
| 5,404,459 A | 4/1995 | Gulick et al. | 395/275 |
| 5,410,754 A | 4/1995 | Klotzbach et al. | 370/85.13 |
| 5,430,762 A | 7/1995 | Vijeh et al. | 375/211 |
| 5,432,511 A | 7/1995 | Sadjadian et al. | 341/61 |
| 5,434,861 A | 7/1995 | Pritty et al. | 370/85.8 |
| 5,442,578 A | 8/1995 | Hattori | 364/746.1 |
| 5,446,726 A | 8/1995 | Rostoker et al. | 370/17 |
| 5,448,565 A | 9/1995 | Chang et al. | 370/85.13 |
| 5,457,446 A | 10/1995 | Yamamoto | 340/825.24 |
| 5,457,679 A | 10/1995 | Eng et al. | 370/16 |
| 5,481,540 A | 1/1996 | Huang | 370/85.13 |
| 5,487,067 A | 1/1996 | Matsushige | 370/85.7 |
| 5,502,748 A | 3/1996 | Wilkinson | 375/354 |
| 5,506,902 A | 4/1996 | Kubota | 380/9 |
| 5,515,376 A | 5/1996 | Murthy et al. | 370/85.13 |
| 5,515,513 A | 5/1996 | Metzger et al. | 395/200.15 |
| 5,517,494 A | 5/1996 | Green | 370/60 |
| 5,521,913 A | 5/1996 | Gridley | 370/58.2 |
| 5,522,059 A | 5/1996 | Marushima et al. | 395/476 |
| 5,530,434 A | 6/1996 | Kanda | 340/825.04 |
| 5,541,923 A | 7/1996 | Kato | 370/85.1 |
| 5,546,385 A | 8/1996 | Caspi et al. | 370/58.2 |
| 5,550,826 A | 8/1996 | Tanaka et al. | 370/85.8 |
| 5,559,796 A | 9/1996 | Edem et al. | 370/60 |
| 5,560,038 A | 9/1996 | Haddock | 395/800 |
| 5,565,929 A | 10/1996 | Tanaka | 348/565 |
| 5,568,476 A | 10/1996 | Sherer et al. | 370/60 |
| 5,568,643 A | 10/1996 | Tanaka | 395/739 |
| 5,570,330 A | 10/1996 | Okawa | 369/44.32 |
| 5,570,466 A | 10/1996 | Oechsle | 395/200.15 |
| 5,598,161 A | 1/1997 | Yamada | 341/159 |
| 5,598,278 A | 1/1997 | Tanaka et al. | 386/96 |
| 5,598,391 A | 1/1997 | Mukawa | 369/54 |
| 5,598,581 A | 1/1997 | Daines et al. | 395/872 |
| 5,600,664 A | 2/1997 | Hayashi | 371/43 |
| 5,602,851 A | 2/1997 | Terashita et al. | 370/403 |
| 5,608,730 A | 3/1997 | Osakabe et al. | 370/471 |
| 5,608,879 A | 3/1997 | Cooke | 395/290 |
| 5,610,905 A | 3/1997 | Murthy et al. | 370/401 |
| 5,610,914 A | 3/1997 | Yamada | 370/395 |
| 5,617,421 A | 4/1997 | Chin et al. | 370/402 |
| 5,621,725 A | 4/1997 | Kawamura et al. | 370/43 |
| 5,623,645 A | 4/1997 | Yip et al. | 395/551 |
| 5,640,399 A | 6/1997 | Rostoker et al. | 370/392 |
| 5,649,175 A | 7/1997 | Kanekal et al. | 395/551 |
| 5,680,622 A | 10/1997 | Even | 395/709 |
| 5,721,927 A | 2/1998 | Baraz et al. | 395/705 |
| 5,742,760 A | 4/1998 | Picazo, Jr. et al. | 395/200.02 |
| 5,761,435 A | 6/1998 | Fukuda et al. | 395/200.68 |
| 5,764,895 A | 6/1998 | Chung | 395/700.8 |
| 5,802,047 A | 9/1998 | Kinoshita | 370/359 |
| 5,805,816 A | 9/1998 | Picazo, Jr. et al. | 395/200.53 |
| 5,844,903 A | 12/1998 | Terashita et al. | 370/403 |
| 5,852,607 A | 12/1998 | Chin | 370/401 |
| 5,857,075 A | 1/1999 | Chung | 395/200.53 |
| 5,859,837 A | 1/1999 | Crayford | 370/230 |
| 5,878,028 A | 3/1999 | Roy et al. | 370/235 |
| 5,884,040 A | 3/1999 | Chung | 395/200.57 |
| 5,892,912 A * | 4/1999 | Suzuki et al. | 370/395.53 |
| 5,893,924 A | 4/1999 | Vakkalagadda | 711/165 |
| 5,917,821 A | 6/1999 | Gobuyan et al. | 370/392 |
| 5,923,654 A | 7/1999 | Schnell | 370/390 |
| 5,923,660 A | 7/1999 | Shemla et al. | 370/402 |
| 5,926,473 A | 7/1999 | Gridley | 370/389 |
| 5,940,596 A | 8/1999 | Rajan et al. | 395/200.72 |
| 5,940,597 A | 8/1999 | Chung | 395/200.72 |
| 5,949,788 A | 9/1999 | Friedman et al. | 370/431 |
| 5,951,651 A | 9/1999 | Lakshman et al. | 709/239 |
| 5,978,378 A | 11/1999 | Van Seters et al. | 370/401 |
| 5,991,305 A | 11/1999 | Simmons et al. | 370/422 |
| 5,999,530 A | 12/1999 | LeMaire et al. | 370/390 |
| 6,012,099 A | 1/2000 | Chung | 709/249 |
| 6,018,526 A | 1/2000 | Liu et al. | 370/401 |
| 6,044,080 A | 3/2000 | Antonov | 370/401 |
| 6,049,546 A | 4/2000 | Ramakrishnan | 370/412 |
| 6,061,351 A | 5/2000 | Erimli et al. | 370/390 |
| 6,067,300 A | 5/2000 | Baumert et al. | 370/413 |
| 6,070,205 A | 5/2000 | Kato et al. | 710/100 |
| 6,075,773 A | 6/2000 | Clark et al. | 370/241 |
| 6,081,532 A | 6/2000 | Fiammante | 370/401 |
| 6,084,877 A | 7/2000 | Egbert et al. | 370/389 |
| 6,088,356 A | 7/2000 | Hendel et al. | 370/392 |
| 6,091,725 A | 7/2000 | Cheriton et al. | 370/392 |
| 6,094,434 A | 7/2000 | Kotzur et al. | 370/401 |
| 6,098,109 A | 8/2000 | Kotzur et al. | 709/249 |
| 6,098,110 A | 8/2000 | Witkowski et al. | 709/249 |
| 6,101,187 A | 8/2000 | Cukier et al. | 370/396 |
| 6,101,188 A | 8/2000 | Sekine et al. | 370/401 |
| 6,108,345 A | 8/2000 | Zhang | 370/445 |
| 6,111,874 A | 8/2000 | Kerstein | 370/389 |
| 6,122,277 A | 9/2000 | Garmire et al. | 370/390 |
| 6,122,667 A | 9/2000 | Chung | 709/228 |
| 6,130,891 A | 10/2000 | Lam et al. | 370/401 |
| 6,137,797 A | 10/2000 | Bass et al. | 370/392 |
| 6,151,297 A * | 11/2000 | Congdon et al. | 370/216 |
| 6,157,951 A | 12/2000 | Vasa | 709/223 |
| 6,222,840 B1 | 4/2001 | Walker et al. | 370/389 |

| | | | |
|---|---|---|---|
| 6,233,242 B1 | 5/2001 | Mayer et al. ................ | 370/412 |
| 6,233,246 B1 | 5/2001 | Hareski et al. ............. | 370/422 |
| 6,243,756 B1 | 6/2001 | Whitmire et al. ........... | 709/232 |
| 6,247,102 B1 | 6/2001 | Chin et al. .................. | 711/150 |
| 6,252,879 B1 | 6/2001 | Zhang ........................ | 370/401 |
| 6,256,313 B1 | 7/2001 | Chung ........................ | 370/401 |
| 6,301,256 B1 | 10/2001 | Vasa .......................... | 370/401 |
| 6,308,218 B1 | 10/2001 | Vasa .......................... | 709/238 |
| 6,363,067 B1 | 3/2002 | Chung ........................ | 370/364 |
| 6,363,075 B1 | 3/2002 | Huang et al. ............... | 370/412 |
| 6,442,168 B1 | 8/2002 | Vasa .......................... | 370/401 |
| 6,446,173 B1 | 9/2002 | Pham ......................... | 711/147 |
| 6,526,055 B1 | 2/2003 | Perlman et al. ............. | 370/392 |

FOREIGN PATENT DOCUMENTS

| | | | | |
|---|---|---|---|---|
| EP | | 0785698 A2 | 7/1997 | ........... H04Q/11/04 |
| WO | WO 96/13922 | | 5/1996 | ........... H04L/12/44 |
| WO | WO 96/21302 | | 7/1996 | ........... H04L/12/46 |
| WO | WO 97/18657 | | 5/1997 | ........... H04L/12/18 |

OTHER PUBLICATIONS

NEC Data Sheet, MOS Integrated Circuit μPD4516421, 4516821, 4516161 16M–bit Synchronous DRAM, Nov. 1995.

Printout of internet website http:www.ti.com/sc/docs/network/tswitch/product.htm#3150al, ThunderSWITCH Product Information, "ThunderSWITCH Product Descriptions," Feb. 1997.

Texas Instruments Product Preview SPWS027, "TNETX3150 ThunderSWITCH™ 15–Port 10–/100–MBIT/S Ethernet™ Switch," pp. 1–85, Sep. 1996.

Hermant Kanakia and David R. Cheriton, "The VMP Network Adapter Board (NAB): High–Performance Network Communication for Multiprocessors," Computer Communications Review, vol. 18, No. 4, pp. 175–187, 1988.

* cited by examiner-

Triplet

| Source Port Identification 250 | Dest. Port Identification 252 | Memory Address 254 |

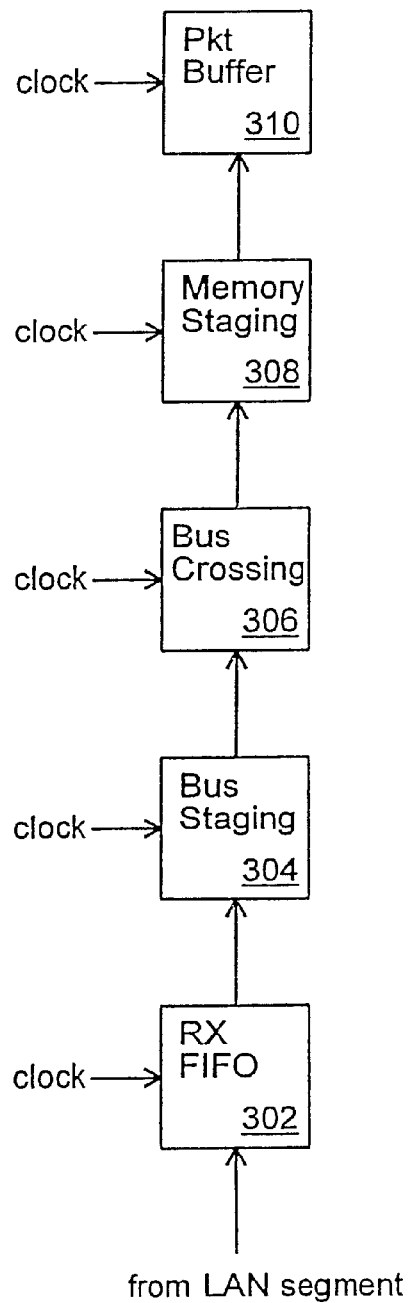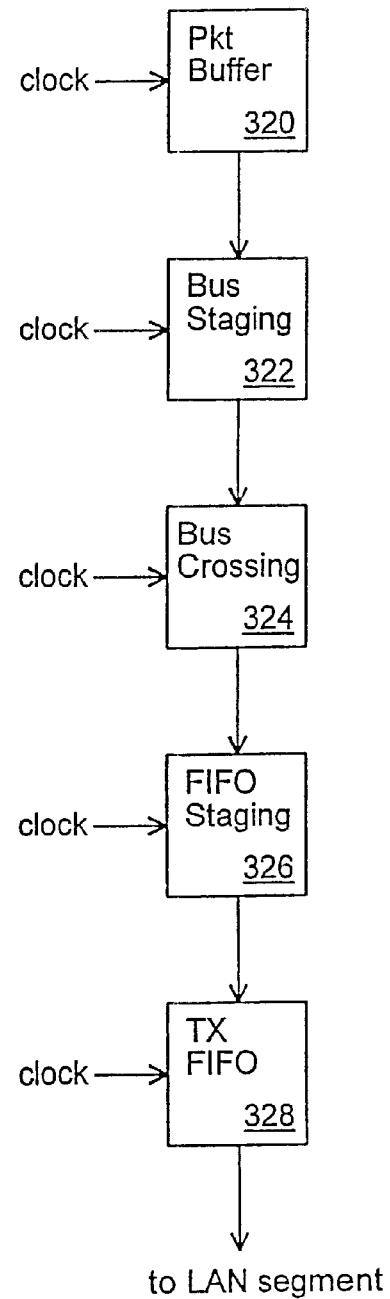
Fig. 6A
Fig. 6B

DATA PIPELINE TIMING OPTIMIZATION TECHNIQUE IN A MULTI-PORT BRIDGE FOR A LOCAL AREA NETWORK

This application is a continuation-in-part of U.S. patent application Ser. No. 09/050,750, filed on Mar. 30, 1998, which claims the benefit of U.S. Provisional Application No. 60/059,171, filed Sep. 17, 1997.

FIELD OF THE INVENTION

The invention relates to a multi-port bridge for a local area network. More particularly, the invention relates to a technique for optimizing a data pipeline in a multi-port bridge for a local area network according to timing considerations.

BACKGROUND OF THE INVENTION

Nodes of a local area network (LAN) are typically interconnected by a shared transmission medium. The amount of data traffic that the shared transmission medium can accommodate, however, is limited. For example, only one node at a time can successfully transmit data to another node over the shared transmission medium. If two or more nodes simultaneously attempt to transmit data, a data collision occurs, which tends to corrupt the data being transmitted. Thus, nodes that share a transmission medium are considered to be in a same collision domain.

A multi-port bridge allows simultaneous communication between nodes of the LAN by segmenting the LAN into multiple collision domains (also referred to as network segments or LAN segments), each segment having a corresponding transmission medium.

FIG. 1 illustrates a conventional local area network including a multi-port bridge 10. The multi-port bridge 10 has eight ports A–H, though the number of ports can vary. Each port A–H is connected to a segment 11–18 of the LAN. Each segment 11–18 typically includes one or more nodes 19–34, such as a workstation, a personal computer, a data terminal, a file server, a printer, a facsimile, a scanner or other conventional digital device. Each of the nodes 19–34 has an associated node address (also referred to as a medium access control (MAC) address) which uniquely identifies the node. The nodes 19–34 are configured to send data, one to another, in the form of discrete data packets.

When the LAN operates according to Ethernet standards, such as the Institute of Electrical and Electronics Engineers (IEEE) 802.3 standard, data is communicated in the form of discrete packets. FIG. 2 illustrates a conventional IEEE 802.3 data packet 40. The data packet 40 includes an eight byte long pre-amble 41 which is generally utilized for synchronizing a receiver to the data packet 40. The pre-amble 41 includes seven bytes of pre-amble and one byte of start-of-frame. Following the pre-amble 41, the data packet 40 includes a six-byte-long destination address 42, which is the node address of a node which is an intended recipient for the data packet 40. Next, the data packet 40 includes a six-byte-long source address 43, which is the node address of a node which originated the data packet 40. Following the source address 43 is a two-byte length field 44. Following the length field 44 is a data field 45. The data field 45 can be up to 1500 bytes long. Finally, the data packet 40 includes a two-byte frame check field 46 which allows a recipient of the data packet 40 to determine whether an error has occurred during transmission of the data packet 40.

When a node (source node) sends data to another node (destination node) located on its same segment of the LAN (intra-segment communication), the data is communicated directly between the nodes without intervention by the multi-port bridge 10 and is known as an intra-segment packet. Therefore, when the multi-port bridge 10 receives an intra-segment packet, the multi-port bridge 10 does not bridge the packet (the packet is filtered). When a node (source node) sends a data packet to another node (destination node) located on a different segment (intersegment communication), the multi-port bridge 10 appropriately forwards the data packet to the destination node.

Problems can arise, however, when the capabilities of the multi-port bridge 10 are exceeded by network demand. When data packets 40 are received by the multi-port bridge 10 at a rate that is higher than the rate at which the multi-port bridge 10 can appropriately forward each packet 40, the multi-port bridge 10 becomes a source of network congestion. This problem is exacerbated as network users place increasing demands on the network.

Therefore, what is needed is improved technique for increasing the data packet handling capacity in a multi-port bridge for a local area network.

SUMMARY OF THE INVENTION

The invention is a technique for optimizing a data pipeline in a multi-port bridge for a local area network (LAN) according to timing considerations. The multi-port bridge includes a plurality of ports for communicating data packets with a corresponding segment of the LAN. Each port is coupled to a data bus included in the multi-port bridge. Packet buffers are also coupled to the data bus for temporarily storing data packets undergoing transfer among the ports. The multi-port bridge includes a receive data path by which the multi-port bridge receives data packets from segments of the LAN and, then, stores them in the packet buffers. In addition, the multi-port bridge includes a transmit data path by which the multi-port bridge retrieves the data packets from the packet buffers and, then, transmits them to appropriate segments of the LAN.

More particularly, the receive data path for a data packet includes receiving the packet from a corresponding segment of the LAN into a receive buffer of a source port for the packet. Then, access to the data bus for transferring the packet is obtained. Next, the data packet is transferred across the data bus. Then, the packet buffers are accessed. Finally, the data packet is loaded into the packet buffers. The transmit data path for a data packet includes obtaining access to the packet buffers for retrieving the data packet. Then, access to the data bus is obtained. Next, the packet is retrieved from the packet buffers and transferred across the data bus. Then, the data packet is loaded into a transmit buffer of a destination port for the packet. Finally, the data packet is transmitted to a segment of the LAN associated with the destination port.

Accordingly, each of the receive data path and the transmit data path each includes a number of stages arranged in a serial path. Each stage performs a corresponding operation on a data packet as it progresses through the multi-port bridge. Each packet received is processed in accordance with the receive data path, one packet after another. Similarly, each packet to be transmitted is processed according to the transmit data path, one packet after another. Progression through each stage is in accordance with a bus clock signal. Accordingly, an equal amount of time is generally taken to progress a data packet through each stage of the receive and transmit data paths.

The required packet handling capacity of the multi-port bridge is related to a sum of the throughput capacities of all the ports, whereas, the actual packet handling capacity of the multi-port bridge is related to the frequency of the bus clock signal. The bus clock signal, however, can only be increased to a level commensurate with the slowest stage in each of the receive and transmit data paths. The slowest stage in each path is identified and subdivided into two or more subdivided stages wherein the subdivided stages together perform the operation of the original stage. Because each subdivided stage performs fewer operations than the original stage, each subdivided stage performs its associated operation in less time. Accordingly, the bus clock can be operated at a higher frequency. An expected trade-off, however, is increased latency. Thus, although the bus clock can be operated at a higher frequency, the total number of stages has increased. Accordingly, the total amount of time required for a data packet to traverse all the stages is increased. This trade-off is desirable because Labs tend to be latency-tolerant to a certain extent.

This technique can be repeated for selected stages in the receive and transmit data paths until the actual packet handling capacity of the multi-port bridge meets or exceeds the required packet handling capacity.

In accordance with an aspect of the present invention, A method of optimizing a data path in a multi-port bridge for a local area network (LAN), wherein the method comprises steps of: identifying a data path through the multi-port bridge wherein the data path includes a plurality of stages arranged in serial, wherein each stage performs a corresponding operation on data received from the LAN by the multi-port bridge prior to transmission of the data to the LAN by the multi-port bridge; identifying a stage in the data path wherein the identified stage requires a period of time to perform its corresponding operation; and subdividing the identified stage into two or more subdivided stages wherein each of the subdivided stages performs a corresponding operation and wherein the operations performed by the subdivided stages collectively perform the operation associated with the identified stage and wherein each of the two or more subdivided stages requires a corresponding period of time to perform its corresponding operation which is shorter than the period of time required for the identified stage to perform its corresponding operation.

In accordance with another aspect of the present invention, a method of optimizing a data path in a multi-port bridge for a local area network (LAN), wherein the method comprises steps of: identifying a data path through the multi-port bridge wherein the data path includes a plurality of stages arranged in serial, wherein each stage performs a corresponding operation on data received from the LAN by the multi-port bridge prior to transmission of the data to the LAN by the multi-port bridge; identifying a stage in the data path wherein the identified stage requires a period of time to perform its corresponding operation which is longer than any other stage in the data path; and subdividing the identified stage into two or more subdivided stages wherein each of the subdivided stages performs a corresponding operation and wherein the operations performed by the subdivided stages collectively perform the operation associated with the identified stage and wherein each of the two or more subdivided stages requires a corresponding period of time to perform its corresponding operation which is shorter than the period of time required for the identified stage to perform its corresponding operation.

BRIEF DESCRIPTION OF THE DRAWINGS

FIG. 6A illustrates a serial receive data path in the multi-port bridge illustrated in FIG. 3 for receiving data packets from a LAN segment and for loading the received data packets into the packet buffers.

FIG. 6B illustrates a serial transmit data path in the multi-port bridge illustrated in FIG. 3 for retrieving data packets from the packet buffers and transmitting the retrieved data packets to an appropriate LAN segment.

DETAILED DESCRIPTION OF A PREFERRED EMBODIMENT

In the preferred embodiment, the present invention is utilized for appropriately directing data packets through a multi-port bridge for an Ethernet LAN. It will be apparent, however, that other devices in an Ethernet LAN, such as a switch or a router, or devices in a network operating according to another networking standard, can utilize the advantages of the present invention.

Triplet Architecture

Figure 1:
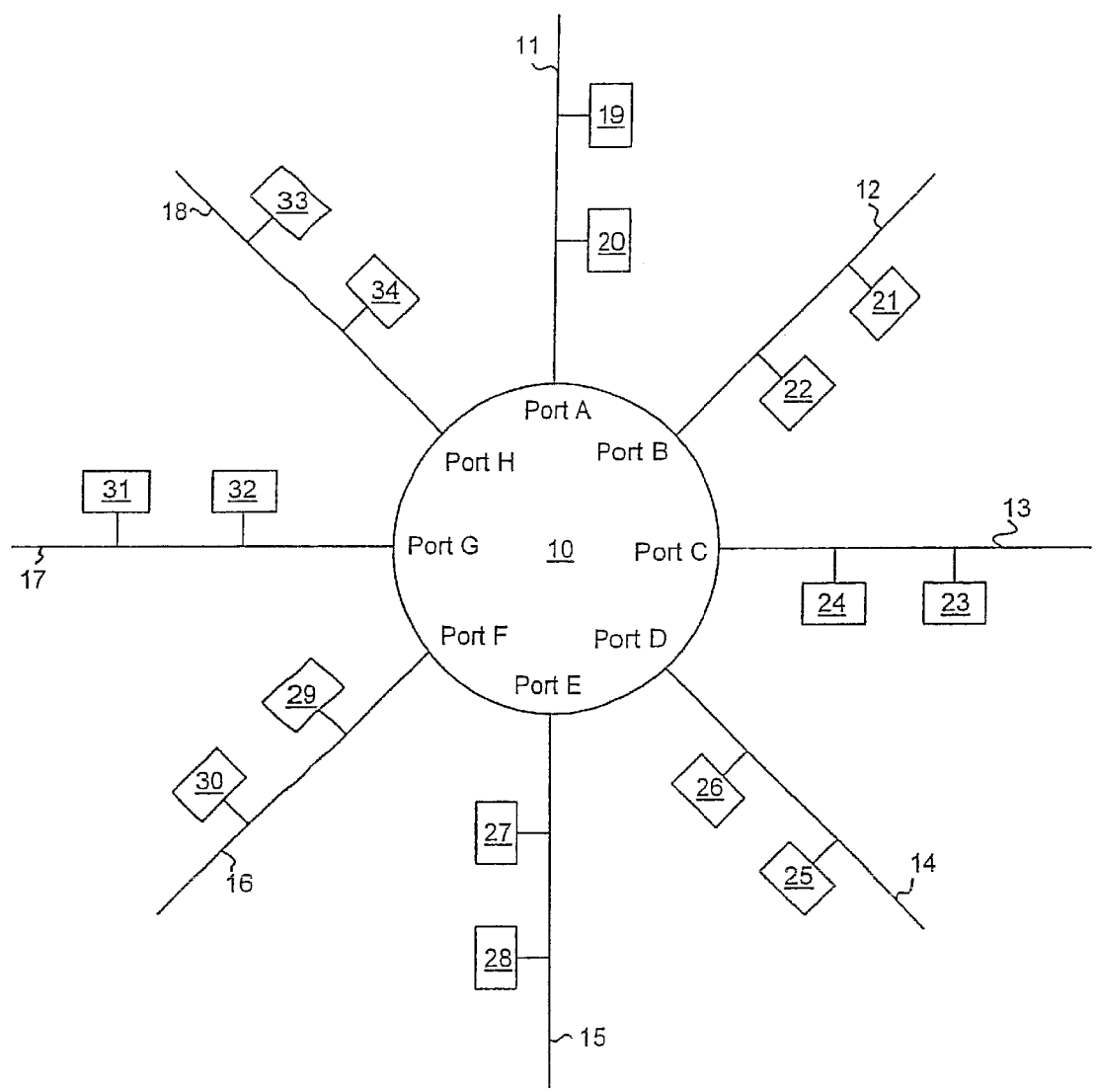
FIG. 1 illustrates a conventional local area network (LAN) including a multi-port bridge.
Figure 2:
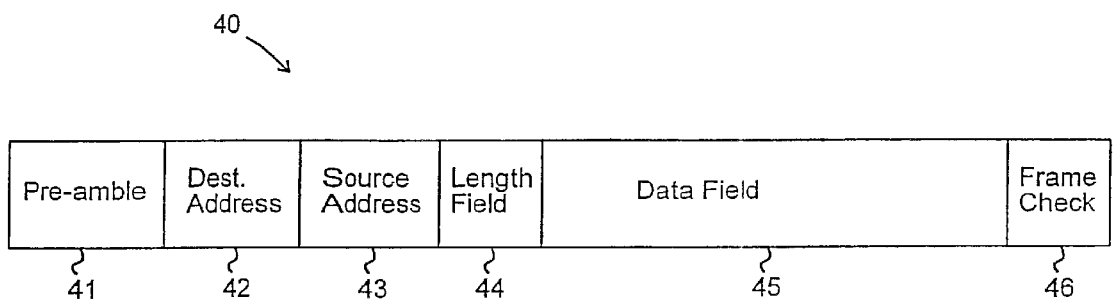
FIG. 2 illustrates a conventional IEEE 802.3 data packet.
Figure 3:
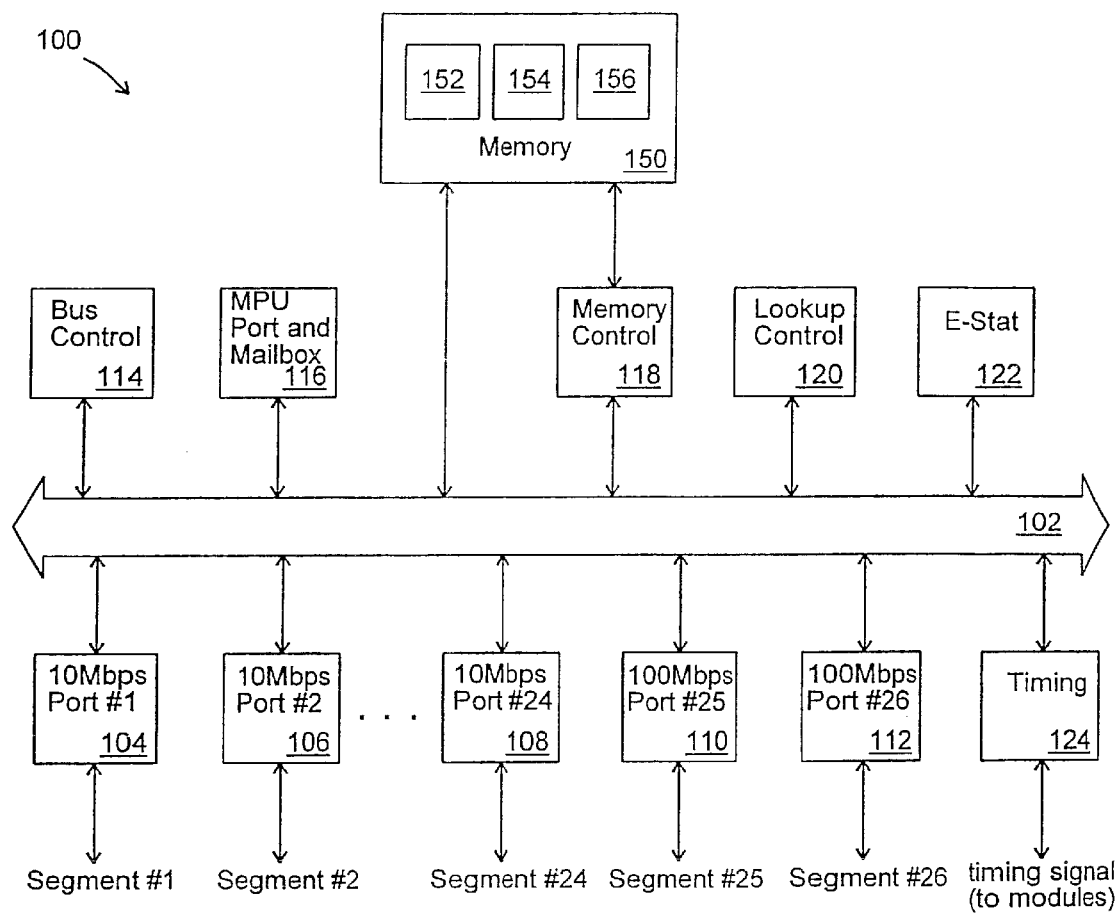
FIG. 3 illustrates a block schematic diagram of a first embodiment of a multi-port bridge according to the present invention.

FIG. 3 illustrates a block schematic diagram of a multi-port bridge 100 in accordance with the present invention. A high speed communication bus 102 provides an interconnection for each of the functional blocks 104–124 of the multi-port bridge 100. The communication bus 102 preferably includes five command lines and thirty-two data lines, though it will be apparent that other bus configurations can be utilized. Twenty-four 10 Mbps ports 104–108 and two 100 Mbps ports 110–112 are each coupled to the communication bus 102 and can be coupled to a respective LAN segment, each LAN segment having one or more nodes. Each of the twenty-four 10 Mbps ports 104–108 transmit and receive data packets at a rate of 10 Mbps, half-duplex, whereas, the two 100 Mbps ports 110–112 transmit and receive data packets at a rate of 100 Mbps, full-duplex. It will be apparent, however, that other numbers of ports and other port configurations can be utilized.

A bus control module 114 controls access to the communication bus 102 by collecting requests from the ports 104–112 and from the other modules. Based upon the requests, the bus control module 114 grants access to the communication bus 102 according to an appropriate priority. The bus control module 114 also controls access to a memory device 150 by an external processor (MPU)(not shown). An MPU port and mailbox module 116 provides an interface between the multi-port bridge 100 and the external processor for performing various functions, including loading data into registers of the multi-port bridge 100, fetching data from registers of the multi-port bridge 100 and transferring data packets between the external processor and the ports 104–112 of the multi-port bridge 100.

A memory control module 118 provides an interface between the memory device 150 and the communication bus 102 and also provides an interface between the memory device 150 and a look-up control module 120. The memory device 150 includes mailboxes 152 for exchanging information between the external processor and the multi-port bridge 100. In addition, the memory device includes look-up tables 154. The look-up tables 154 include entries which indicate which port of the multi-port bridge 100 is associated with each node of the LAN. The look-up tables 154 are utilized for appropriately directing data packets received by the multi-port bridge 100 among the ports 104–112.

The look-up control module 120 receives addresses of nodes and associated port identifications from the communication bus 102. These addresses and identifications are stored in the look-up tables 154. The look-up control module 120 facilitates utilizing the look-up tables 154 for directing packets among the ports 104–112 based upon the destination address of each packet. The memory device 150 also includes packet buffers 156 for temporarily storing data packets that are being directed through the multi-port bridge 100. The memory device 150 is preferably an SDRAM device, though other types of memory devices can be utilized, such as DRAM, SRAM, RAM or EDO. In the case of dynamic memory, the memory control module 118 refreshes the memory device 150 as required.

An E-stat module 122 collects data packet routing statistics and provides them to the external processor for performing analysis and network management functions. A timing module 124 provides timing signals to the ports 104–112 and to the other modules 114–122 of the multi-port bridge 100. Preferably, a primary clock signal cycles at 40 MHz. Other clock signals at 10 MHz and 25 MHz are derived from the primary clock signal.

Preferably, the modules 114–124 are each implemented as a finite state machine, though the modules 114–124 can alternately be implemented as one or more processors operating according to stored software programs. Finite state machines are preferred as they can generally perform the necessary operations faster, thus, resulting in a higher packet handling bandwidth for the multi-port bridge 100.

Figure 4:
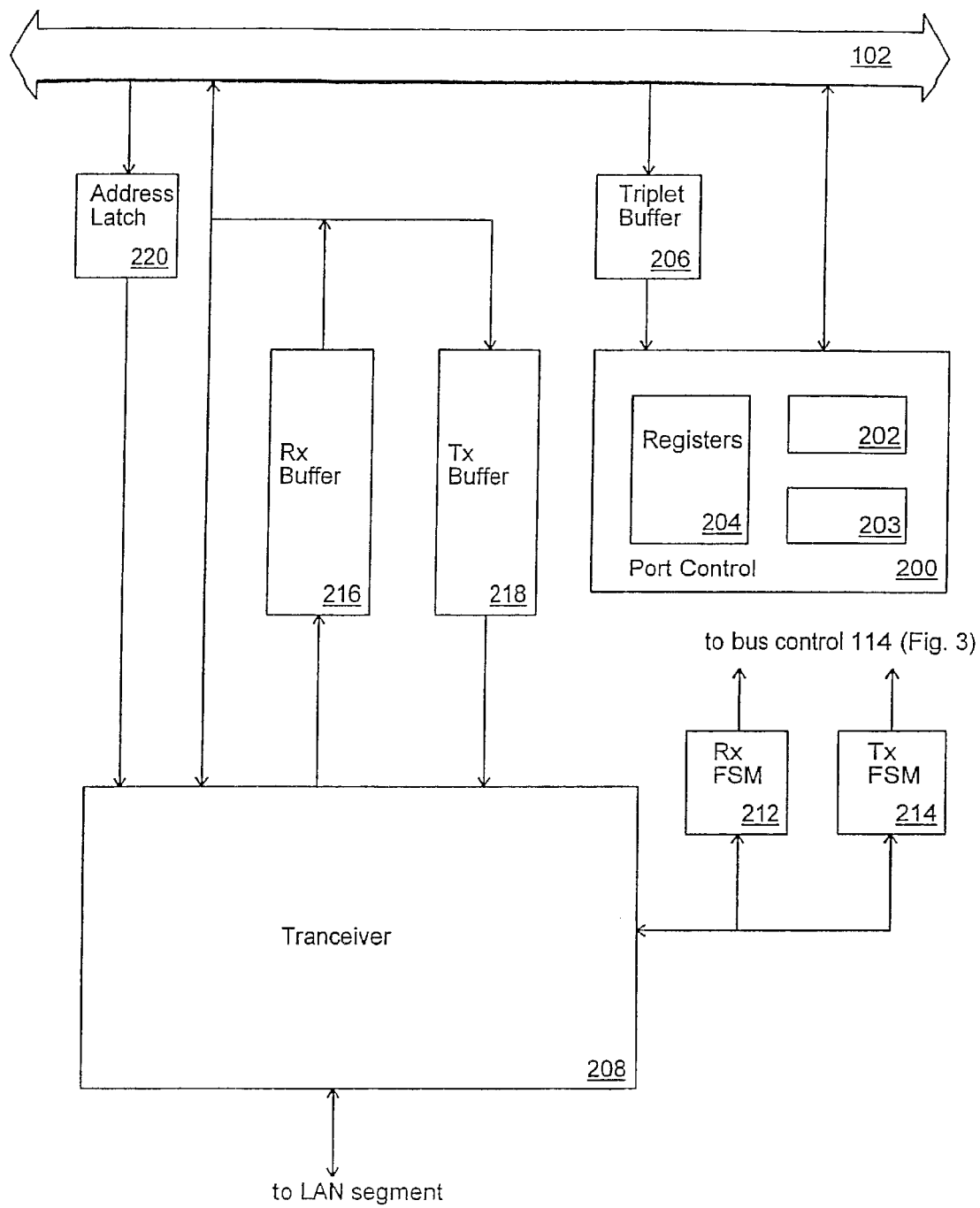
FIG. 4 illustrates a port of the multi-port bridge illustrated in FIG. 3.

FIG. 4 illustrates a block schematic diagram of one of the ports 104–112 of the multi-port bridge 100. A port controller 200, including a bus interface 202, a triplet finite state machine 203, and registers 204, provides control for the port and an interface between the port and the communication bus 102. The port controller 200 monitors the communication bus 102 for commands and data directed to the port and also provides commands to the communication bus 102 at times when the port has control of the communication bus 102. The registers 204 contain data for initializing the port upon start-up and for collecting status information for the port. The port also includes a triplet FIFO buffer 206 coupled between the communication bus 102 and the port controller 200. The triplet buffer 206 stores memory pointers ("triplets"—illustrated in FIG. 5 and explained in more detail herein) for data packets being queued in the packet buffers 156 (FIG. 3) of the memory device 150 (FIG. 3). Preferably, the triplet buffer 206 holds 128 triplets, each triplet preferably being four bytes long.

The port also includes a medium access control (MAC) transceiver 208 which accesses a LAN segment associated with the port for transmitting and receiving data packets to and from the LAN segment. Coupled to the transceiver 208 are a receive finite state machine 212, for controlling the transceiver 208 during packet reception, and a transmit finite state machine 214, for controlling the transceiver 208 during packet transmission. The receive finite state machine 212 and the transmit finite state machine 214 are each coupled to the bus control module 114 (FIG. 3) for requesting access to the communication bus 102 therefrom.

Packets received from the associated LAN segment by the transceiver 208 are directed to the communication bus 102 through a receive FIFO buffer 216, while packets to be transmitted over the LAN segment 210 are directed from the communication bus 102 to the transceiver 208 through a transmit FIFO buffer 218. Preferably, the receive buffer 216 holds 128 bytes while the transmit buffer 218 holds 256 bytes. Note that an IEEE 802.3 data packet can include up to 1500 bytes of data in addition to the source address, the destination address and the frame check field. Thus, in the preferred embodiment of the multi-port bridge 100, neither the receive buffer 216, nor the transmit buffer 218 is capable of storing an entire IEEE 802.3 data packet of the maximum size. An address latch 218 is also included in the port for latching addresses from the communication bus 102 and providing them to the transceiver 208.

Serial Packet Bridging

Figure 5:
FIG. 5 illustrates a "triplet" according to the present invention, including a first field containing an identification of a source port, a second field containing an identification of a destination port and a third field containing a memory address.

Referring to FIGS. 3–5, assume a data packet, such as an IEEE 802.3 data packet, originating from a node (source node) in a segment of the LAN is received by a corresponding one of the ports 104–112 (source port) of the multi-port bridge 100. The receive buffer 216 in the source port receives the data packet as the packet is being received by the transceiver 208 in the source port from the LAN segment associated with the source port. After the first twelve bytes, corresponding to the source address and the destination address for the packet, are received, the receive finite state machine 212 requests a look-up operation (cycle) from the bus control module 114 by raising an interrupt request line coupled to the bus control module 114. The bus control module 114 monitors such requests and grants each request according to an appropriate priority. Upon granting the request, the bus control module 114 notifies the source port by placing a bit pattern identifying a bus grant on the command lines of the communication bus 102 and a bit pattern uniquely identifying the source port on the data lines of the communication bus 102.

The first four bytes of the destination address for the packet are then placed from the receive buffer 216 of the source port onto the data lines of the communication bus 102, while a corresponding bit pattern is placed on the command lines of the communication bus 102 by the bus interface 202 of the source port. The look-up control module 120 (FIG. 3) receives the first four bytes of the destination address. Then, the source port places the last two bytes of the destination address for the packet and the first two bytes of the source address for the packet on the data lines of the communication bus 102 and places a corresponding bit pattern on the command lines of the communication bus 102. The look-up control module 120 receives these four bytes. Finally, the source port places the last four bytes of the source address for the packet on the data lines of the communication bus 102 and places a corresponding bit pattern on the command lines. The look-up control module 120 also receives these four bytes. Thus, the destination address and source address are transferred over the communication bus 102 in segments that are each four bytes long as this corresponds to the width (32 bits) of the data lines of the communication bus 102. It will be apparent, however, that the communication bus 102 can have a different number of data lines, in which case, a different number of bytes can be transferred at a time.

Once the look-up control module 120 has received the destination address and the source address for the packet, the look-up control module 120 so notifies the memory control module 118 (FIG. 3). The memory control module 118 then updates the look-up tables 154 (FIG. 3) by ensuring that the source address for the packet is stored in the look-up tables 154 in association with the identification of the source port for the packet. This ensures that the look-up tables 154 accurately reflect any changes that may have occurred in the LAN (referred to as a learning operation or cycle). The information stored during the learning operation is utilized for directing subsequent packets.

Once the learning operation is complete, the memory control 118 module utilizes the look-up tables 154 to determine which port (destination port) is associated with the destination address for the packet (referred to a look-up operation). As a result of performing the look-up operation, the memory control module 118 forms a bit pattern referred to as a "triplet". FIG. 5 illustrates the triplet which includes three fields: a first field 250 containing the identification of the source port, a second field 252 containing the identification of the destination port, and a third field 254 containing a starting address assigned to the incoming packet in the packet buffers 156 of the memory device 150. The first field 250 and the second field 252 are each preferably one byte long, while the third field 254 is preferably two bytes long. It will be apparent, however, that the ordering of the fields of the triplet and the size of each field can be altered. If the source port and the destination port identified by the triplet are the same, this indicates that the source and destination nodes are on the same segment of the LAN (intra-segment communication) and, therefore, the packet does not need to be bridged. In such case, no further action is taken relative to the packet (the packet is filtered).

Otherwise, the memory control module 118 places the triplet on the data lines of the communication bus 102 and places a bit pattern indicating that an "initial triplet" is ready on the command lines. Each port monitors the communication bus 102. If the port identified as the destination port in the triplet is not currently busy transmitting or receiving another packet, the destination port configures itself to receive the packet directly from the source port (cut-through). Alternately, if the triplet buffer 206 in the port identified as the destination port in the triplet is nearly full, the bus controller 202 of the destination port applies a jam request signal to the command lines of the communication bus 102. The source port receives the jam request and, in response, discards the incoming packet and also sends a jam signal over its associated LAN segment. The jam signal causes the node (source node) which is the source of the packet to discontinue sending the packet and attempt to resend the packet after a waiting period.

As illustrated in FIG. 5, the triplets are preferably of a uniform size. Therefore, the exact number of triplets that can be accommodated by a triplet buffer 206 of a port can be determined from the amount of space available in the triplet buffer 206 of the port. Accordingly, unlike prior arrangements, extra space does need to be provided in the port to accommodate a data packet having an unknown length. According to the present invention, however, the jam request is preferably generated by a destination port for a packet when the triplet buffer 206 in the port has space available to store several triplets (e.g. ten triplets). This provides the destination port an ability to store triplets for packets which are in the process of being loaded into the packet buffers 156. The triplet buffer 206 in each port is preferably sized relative to the associated packet buffers 156 in the memory device 150 such that there is little or no possibility that the packet buffers 156 will become full before any triplet buffer 206 becomes full.

Once the triplet has been placed on the communication bus 102, the source port initiates a series of memory write cycles for loading the packet from the receive buffer 216 of the source port into the packet buffers 156 in the memory device 150 starting at the memory address identified by the third field of the triplet. Preferably, the packet buffers 156 include a space allocated to each port for storing packets received by the port. Alternately, the space is allocated to each port for storing packets to be transmitted by the port; it should be noted, however, that only one and not both types of allocated space need be provided. Packets are written into the space allocated to the port in the packet buffers 156 in a circular fashion; each new packet will overwrite portions of the oldest packet in the allocated space.

The packet is preferably loaded into the packet buffers 156 a predetermined offset from the assigned address. This provides a location for storing a header for the packet once the packet has been completely loaded into the packet buffers 156. For example, the header can include an identification number assigned to the packet, the triplet for the packet and a receive status for the packet. The receive status indicates whether or not the entire packet has been successfully received and loaded into the packet buffers 156.

Multiple memory write cycles are generally needed to transfer the entire packet into the packet buffers 156 as the remaining portions of the packet will generally include more than thirty-two bits (the number of data lines in the communication bus 102). Writing of the packet into the packet buffers 156 preferably occurs as the remainder of the packet is still being received into the receive buffer 216 of the source port. For this reason, the receive buffer 216 for each port need not be capable of storing an entire data packet. In addition, if the destination port is configured for cut-through, the destination port will receive the packet into its transmit buffer 218 directly from the communication bus 102 simultaneously with the write cycles for loading of the packet into the packet buffers 156. During such a cut-through operation, the packet is received into a transmit buffer 218 of the destination port for immediate transmission to the LAN segment associated with the destination port.

Once the entire packet has been loaded into the packet buffers 156, the memory control module 118 again places the triplet on the data lines of the communication bus 102 and places a bit pattern on the command lines identifying this as the "final triplet." It should be noted that the initial triplet and the final triplet are preferably identical, while the bit patterns placed on the command lines of the communication bus 102 for identifying each of the initial and final triplet are distinct. The destination port will then store the final triplet in the triplet buffer 206 (FIG. 4) located within the destination port. Thus, the packet is queued for transmission by the destination port.

When the destination port is no longer busy, the destination port retrieves the packet from the packet buffers 156. This is accomplished by the destination port requesting access to the communication bus 102 from the bus control module 114. When the request is granted, the bus control module 114 places a bit pattern indicating a bus grant on the command lines of the communication bus 102 and a bit pattern identifying the port on the data lines. Once the destination port gains control of the communication bus 102, the destination port then initiates a series of read operations over the communication bus 102 by placing the starting address in the packet buffers 156 of the packet (from the third field of the triplet for the packet) on the data lines of the communication bus 102 and places a bit pattern identifying a memory read operation on the command lines. In response, the memory control module 118 accesses the packet in the packet buffers 156. Preferably, the destination port checks the receive status for the packet. If the receive status indicates that the packet was not received successfully, the memory read operation is preferably halted and no further action is taken relative to the packet.

In addition, in the event that a cut-through operation was initiated, but was unsuccessful, the packet will need to be retransmitted by the destination port. For example, the cut-through operation may have been unsuccessful if a data collision occurred during its transmission over the LAN segment associated with the destination port. In such case, the packet is retrieved from the packet buffers 156 as described above.

While the destination port is receiving the packet into its transmit buffer 218 from the packet buffers 156 or directly from the source port (as during cut-through), the destination port begins transmitting the packet to the LAN segment associated with the destination port under control of the transmit finite state machine 214. For this reason, the transmit buffer 218 for each port need not be capable of storing an entire data packet. The packet is then received from the LAN segment associated with the destination port by the destination node for the packet.

Bandwidth Criteria

In accordance with the present invention as illustrated in FIGS. 3–5, each incoming data packet is processed in two principal sequential steps: (1) table look-up and learning operations; and (2) transfer of the data packet from the source port to the destination port(s). Each of these principal sequential steps includes several smaller steps.

For example, when cut-through is not performed, the second principal step includes transferring the data packet from the source port for the packet to the packet buffers 156 (FIG. 3) and, then, transferring the data packet from the packet buffers 156 to the destination port for the packet. FIG. 6A illustrates a serial receive data path in the multi-port bridge 100 for receiving data packets from a LAN segment and loading the received data packets into the packet buffers 156. A data packet received from a LAN segment is received by the receive buffer 216 (FIG. 4) at a stage 302. Then, access to the communication bus 102 (FIG. 3) for transferring the packet is obtained at a stage 304. Next, the data packet is transferred across the communication bus 102 at a stage 306. Then, the packet buffers 156 (FIG. 3) are accessed at a stage 308. Finally, the data packet is loaded into the packet buffers 156 at a stage 310. As can be observed from FIG. 6A, the receive data path includes a number of stages arranged in a serial path. Each packet received is processed in accordance with the receive data path, one packet after another. Progression through each stage is in accordance with the bus clock signal. Accordingly, an equal amount of time is generally taken to progress a data packet through each stage of the receive data path. Longer packets will generally take longer to progress than shorter packets. It will be apparent, however, that portions of a data packet can be in different stages of the receive data path at the same time. For example, portions of a data packet can be loaded into the packet buffers 156 (FIG. 3) while subsequent portions are still be received by the source port.

FIG. 6B illustrates a serial transmit data path in the multi-port bridge 100 for retrieving data packets from the packet buffers 156 and transmitting the retrieved data packets to an appropriate LAN segment. A data packet stored in the packet buffers 156 (FIG. 3) is accessed at a stage 320 for retrieving the data packet. Then, the memory controller 118 (FIG. 3) obtains access to the communication bus 102 (FIG. 3) in a stage 322. Next, the packet is retrieved from the packet buffers 156 and transferred across the bus 102 at a stage 324. Then, the data packet is loaded into the transmit buffer 218 (FIG. 4) of the destination port and prepared for communication to a LAN segment associated with the destination port at a stage 326. Finally, the data packet is transmitted to the LAN segment by the destination port at the stage 328. Note that for a cut-through packet, the packet is passed directly from the stage 306 illustrated in FIG. 6A (bus crossing) to the stage 326 illustrated in FIG. 6B (transmit buffer staging). As can be observed from FIG. 6B, the transmit data path includes a number of stages arranged in a serial path. Each packet to be transmitted is processed by the transmit data path, one packet after another. Progression through each stage is in accordance with the bus clock signal. Accordingly, an equal amount of time is generally taken to progress a data packet through each stage of the transmit data path, though longer packets generally progress more slowly than shorter packets. It will be apparent, however, that portions of a data packet can be in different stages of the transmit data path at the same time. For example, portions of a data packet can be transmitted by a destination port for the packet while subsequent portions are still being retrieved from the packet buffers 156 (FIG. 3).

The amount of bandwidth required by the multi-port bridge 100 so as to successfully perform the second principal step of transferring the data packets between the ports 104–112 under worst-case conditions can be calculated as a sum of the receive and transmit capacity for all the ports 104–112:

Data Bandwidth=Σ(receive and transmit capacity for each port)

Thus, for a multi-port bridge 100 having two 100 Mbps full-duplex ports and twenty-four 10 Mbps half-duplex ports, the required bandwidth for transferring the data packets can be calculated as:

Data Bandwidth=2(2)(100 Mbps)+24(10 Mbps)=640 Mbps

The bandwidth required by the multi-port bridge 100 for overhead operations, such as table look-up and learning, and other operations, such as placing packets on the communication bus 102 a second time in the event of a collision, is estimated by the inventor to be as high as fifty percent (50%) of the required data bandwidth calculated above. Thus, the maximum required bandwidth, including overhead, can be estimated as:

Max. Bandwidth (incl. overhead)=640 Mbps*150%=960 Mbps

The maximum bandwidth of the multi-port bridge 100 is also equal to the width of the data path (e.g. the communication bus 102) multiplied by the clock rate:

Max. Bandwidth (incl. overhead)=bus width*clock rate

Thus, for a communication bus that is 32 bits wide (excluding the command lines), the required clock rate can be calculated as:

clock rate=960 Mbps÷32 bits 30 MHz

Accordingly, in the embodiment of the multi-port bridge 100 illustrated in FIG. 3 and having two 100 Mbps full-duplex ports and twenty-four 10 Mbps half-duplex ports, the bus clock rate should be 30 MHz or higher. Assume, however, that a multi-port bridge is desired having one 1 Giga-bit per second (1 Gbps) full-duplex port and eight 100 Mbps full-duplex ports. In which case, the maximum bandwidth for data transfer and overhead can be estimated as:

Max. Bandwidth=150%[2(1 Gbps)+2(8)(100 Mbps)]=5.4 Gbps

Assuming a 32-bit-wide communication bus 102 (FIG. 3), the required clock rate can be estimated as:

clock rate=5.4 Gbps÷32 bits=170 MHz

However, each portion of a packet bridged by the multi-port bridge 100 illustrated in FIG. 3 must pass from one data path stage to another data path stage before the next packet can be similarly processed. For example, a first packet must have crossed the communication bus 102 (FIG. 3) in stage 306 (FIG. 6A) before a next packet can cross the communication bus 102. The clock rate, however, can only be increased to level commensurate with the slowest stage in the data path. Accordingly, the clock rate cannot be increased such that an insufficient amount of time is allowed time for any stage in the receive or transmit data paths illustrated in FIGS. 6A and 6B to perform its associated function. Thus, the maximum clock rate can be given as:

Max. Clock Rate∝1/slowest stage delay

Accordingly, the bus clock rate and, hence, the maximum rate at which data packets can be bridged by the multi-port bridge 100 illustrated in FIG. 3, is limited by the slowest one of the stages illustrated in FIGS. 6A and 6B. In accordance with the present invention, a technique is provided for increasing the speed at which data packets are processed by a multi-port bridge by serial or parallel subdivision of a selected stage in the receive or transmit data path so as to increase the rate at which data packets are processed by the selected stage.

Figure 7:
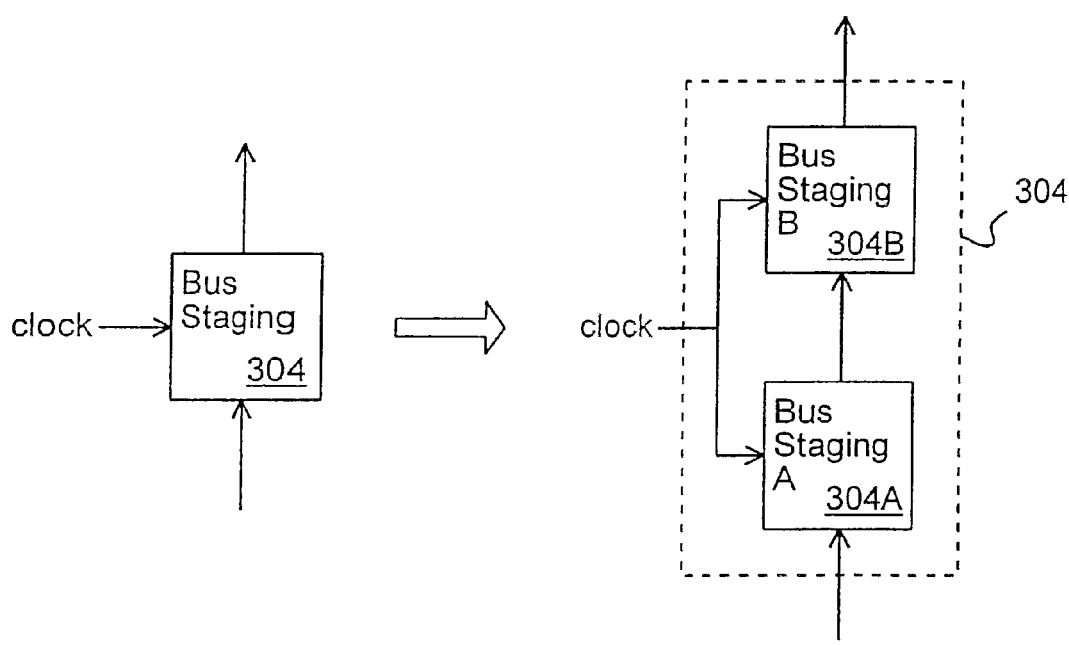
FIG. 7 illustrates serial subdivision of a data path stage according to the present invention.

FIG. 7 illustrates serial subdivision of a data path stage according to the present invention. As illustrated in FIG. 7, the bus staging stage 304 is subdivided into two serial stages 304A and 304B. Because fewer steps are expected to be required for each serially subdivided stage 304A and 304B, each subdivided stage is expected to be able to process data packets at a higher rate than the original, undivided, stage 304. A trade-off, however, is that the latency of the data path is expected to generally increase. Thus, although this technique results in an increased bandwidth for the multi-port bridge 100 because packets can be passed from one stage to another at a higher rate, each packet is expected to generally take longer to pass through the multi-port bridge 100 since there are now more stages through which each packet must pass. Although the bus staging stage 304 is illustrated in FIG. 7 as the stage selected for serial subdivision, it will be apparent that any processing stage in the multi-port bridge 100 can be selected. In the preferred embodiment, the stage selected for serial subdivision is the slowest stage.

This trade-off in which latency and bandwidth are both increased is desirable because local area networks are generally latency tolerant. That is, a recipient of data communicated via the local area network can tolerate slight delays in receiving the data. The local area network is expected to operate more efficiently, however, by avoiding delays due to congestion and lost packets caused by a multi-port bridge having insufficient bandwidth.

Figure 8:
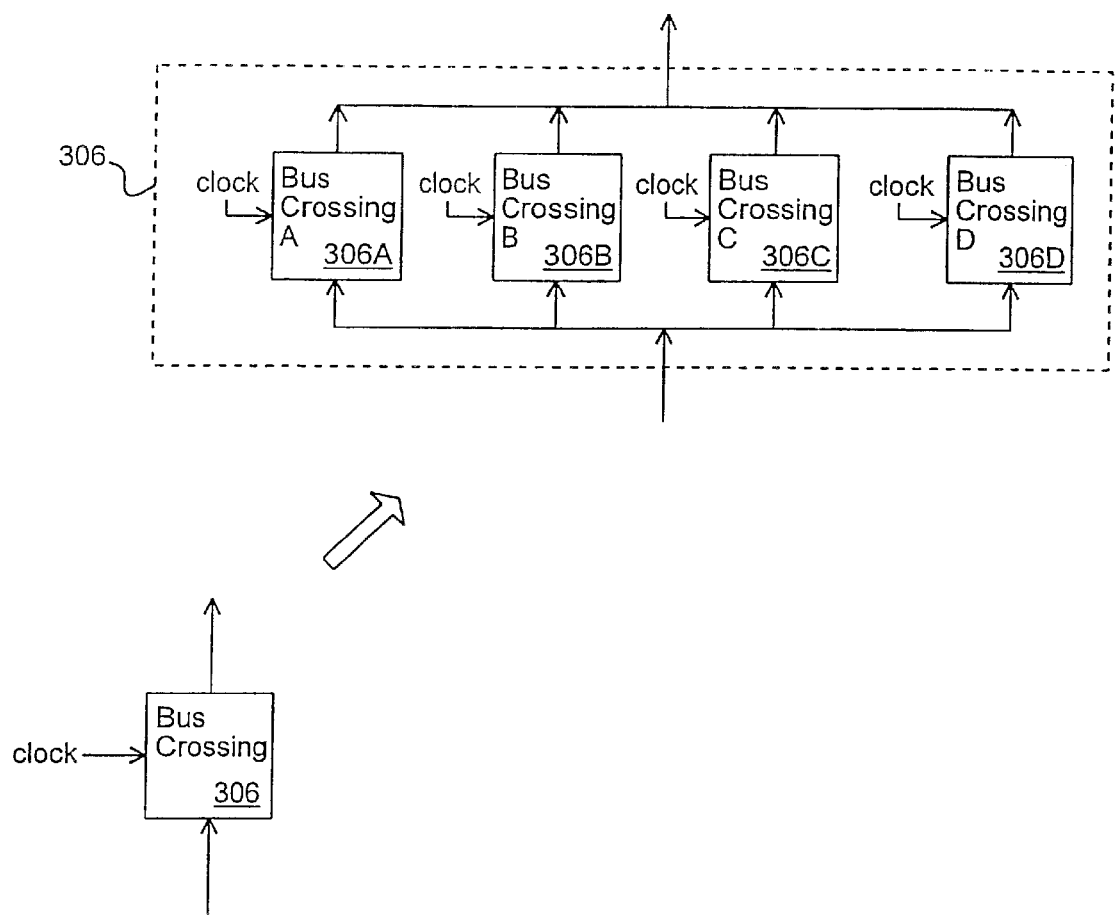
FIG. 8 illustrates parallel subdivision of a data path stage according to the present invention.

FIG. 8 illustrates parallel subdivision of a data path stage according to the present invention. As illustrated in FIG. 8, the bus crossing stage 306 is subdivided into four parallel stages 306A, 306B, 306C and 306D. Because fewer steps are expected to be required for each parallelly subdivided stage 306A, 306B, 306C and 306D, each subdivided stage is expected to be able to process packets at a higher rate than the original stage. A trade-off, however, is that the complexity of the hardware required to implement the parallel stages and the integrated circuit chip area occupied by the parallel stages are generally increased. Although the bus crossing stage 306 is illustrated in FIG. 8 as the stage selected for parallel subdivision, it will be apparent that any processing stage in the multi-port bridge 100 can be selected. In the preferred embodiment, the stage selected for parallel subdivision is the slowest stage.

De-Coupling of Table Operations from Data Transfer Operations

Returning to the example of a multi-port bridge having one 1 Gbps full-duplex port and eight 100 Mbps full-duplex ports, a time criterion for the look-up and learning operation can be calculated. Assume that it is desired to have zero packet loss during a worst-case scenario where each port is simultaneously receiving (and transmitting) data at its maximum rate. Further, because a series of data packets of the minimum length will require a maximum number of look-up and learning operations per unit of time, assume that each data packet is of the minimum length of 64 bytes. The time required to receive a 64-byte packet at 100 Mbps, including the inter-packet gap of 960 ns, can be calculated:

Receive Time @100 Mbps=(64 bytes)(8 bits/byte)(10 ns/bit)+960 ns=6,720 ns

Similarly, the time required to receive a 64-byte packet at 1 Gbps, including the inter-packet gap of 96 ns, can be calculated:

Receive Time @(1 Gbps=(64 bytes)(8 bits/byte)(1 ns/bit)+96 ns=672 ns

Thus, within a single time period of 6,720 ns, the multi-port bridge having one 1 Gbps full-duplex port and eight 100

Mbps full-duplex ports can receive up to eight packets at 100 Mbps and ten packets at 1 Gbps. Accordingly, such a multi-port bridge must be capable of performing eighteen look up and learning operations within a 6720 ns period. On average, each look-up and learning operation must take less than 372 ns:

Max. Ave. Look-Up Time=6720 ns÷18 packets=372 ns/packet

Figure 9:
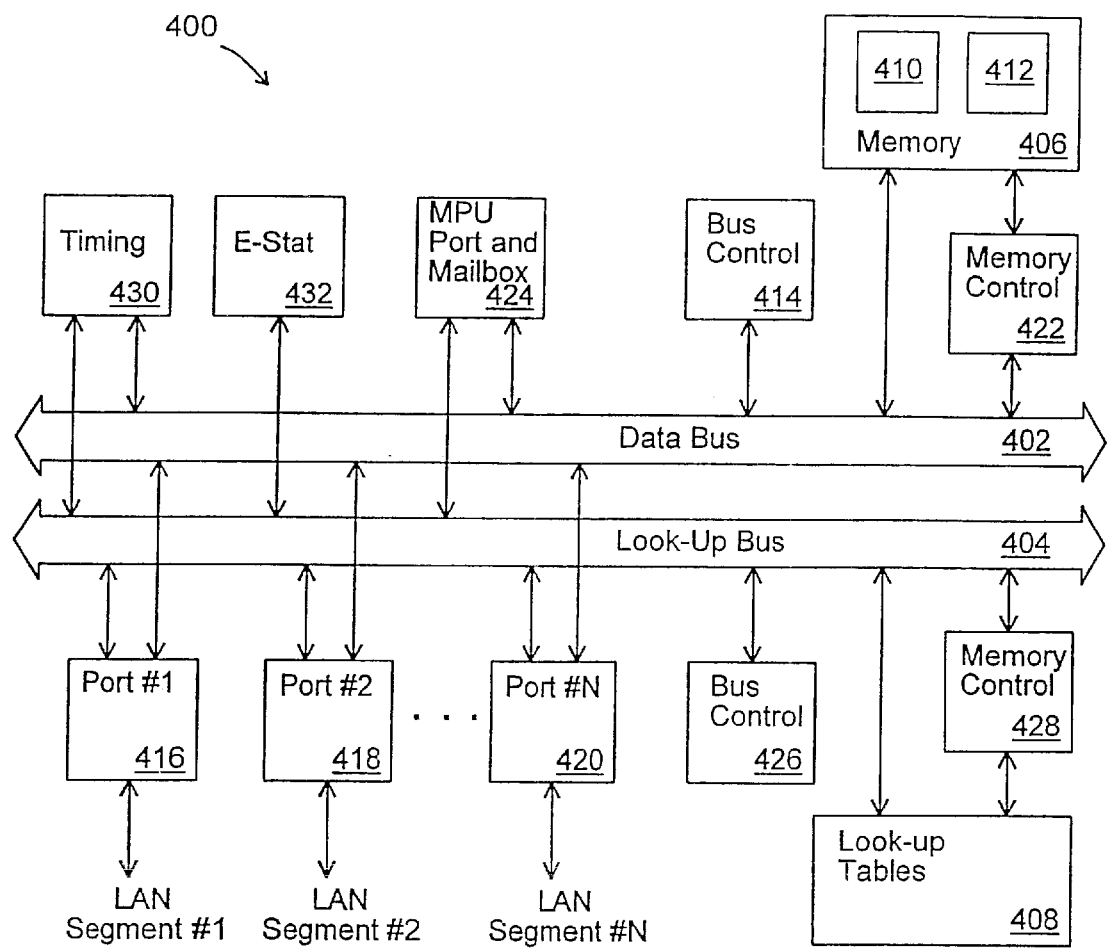
FIG. 9 illustrates a block schematic diagram of a multi-port bridge according to the present invention having a data packet transfer bus and a look-up bus.

Thus, it is desired to increase the data handling bandwidth of a multi-port bridge and to minimize the amount of time required to perform look-up and learning operations. FIG. 9 illustrates a block schematic diagram of a multi-port bridge 400 according to the present invention having a data packet transfer bus 402 and a look-up bus 404. The multi-port bridge 400 illustrated in FIG. 9 differs from the multi-port bridge 100 illustrated in FIG. 3 in that the communication bus 102 illustrated in FIG. 3 is replaced with two independent buses, the data bus 402 and the look-up bus 404. In addition, the memory device 150 illustrated in FIG. 3 is replaced with a memory device 406 coupled to the data bus 402 and a memory device 408 coupled to the look-up bus 404. The memory device 406 includes mailboxes 410 and packet buffers 412 while the memory device 408 provides storage for look-up tables. The multi-port bridge 400 interconnects a number of LAN segments, where each LAN segment is coupled to a corresponding one of the ports 416–420 of the multi-port bridge 400. Each port 416–420 is coupled to both the data bus 402 and to the look-up bus 404.

The data bus 402 is utilized primarily for transferring data packets between the ports 416–420 and the packet buffers 412 and for transferring data packets among the ports 416–420. A bus control module 414 is coupled to the data bus 402 for controlling access to the data bus 402 by collecting requests from the ports 416–420 and from the other modules coupled to the data bus 402. Based upon the requests, the bus control module 414 grants access to the data bus 402 according to an appropriate priority. A memory controller 422 provides an interface between the memory device 406 and the data bus 402. The packet buffers 412 are utilized for temporarily storing data packets undergoing transfer between the ports 416–420. An MPU port and mailbox module 424, in conjunction with the mailboxes 410, provides an interface between the multi-port bridge 400 and an external processor (not shown) for performing various functions. These functions include loading data into registers of the multi-port bridge 400, fetching data from registers of the multi-port bridge 400 and transferring data packets between the external processor and the ports 416–420 of the multi-port bridge 400.

The look-up bus 404 is utilized for performing look-up and learning operations and additional overhead operations, as necessary. The look-up tables of the memory device 408 include entries which indicate which port of the multi-port bridge 400 is associated with each node of the LAN. A bus controller 426 collects requests for look-up and learning operations from the ports 416–420 and, in response to those requests, grants access to the look-up bus 404 in an appropriate priority. The bus controller 426 also facilitates storing addresses of nodes and associated port identifications in the look-up tables and facilitates utilizing the look-up tables for directing packets among the ports 416–420 based upon the destination address of each packet. A memory controller 428 provides an interface between the memory device 408 and the look-up bus 404.

A timing module 430 provides timing signals to the ports 416–420 and to the other modules of the multi-port bridge 400. An E-stat module 432 collects data packet routing statistics and provides them to the external processor for performing analysis and network management functions.

Preferably, the modules 414, 422–432 are each implemented as a finite state machine, though the modules 414, 422–432 can alternately be implemented as one or more processors operating according to stored software programs. Finite state machines are preferred as they can generally perform the necessary operations faster, thus, resulting in a higher packet handling bandwidth for the multi-port bridge 400. In the preferred embodiment, the ports 416–420 include one 1 Gbps full-duplex port and eight 100 Mbps full-duplex ports. It will be apparent, however, that other numbers of ports and other port configurations can be utilized.

The arrangement illustrated in FIG. 9 allows data packet transfer operations to be performed via the data bus 402 at the same that look-up and learning operations are performed via the look-up bus 404. By performing these operations in parallel, as opposed to serially (as in FIG. 3 where a single bus is time-division multiplexed for both data packet transfer operations and for look-up and learning operations), the packet handling capacity of the multi-port bridge 400 is enhanced. For example, by incorporating this improvement along with others discussed herein, the portion of the bandwidth of the data transfer path consumed by overhead operations can be dramatically reduced.

Figure 10:
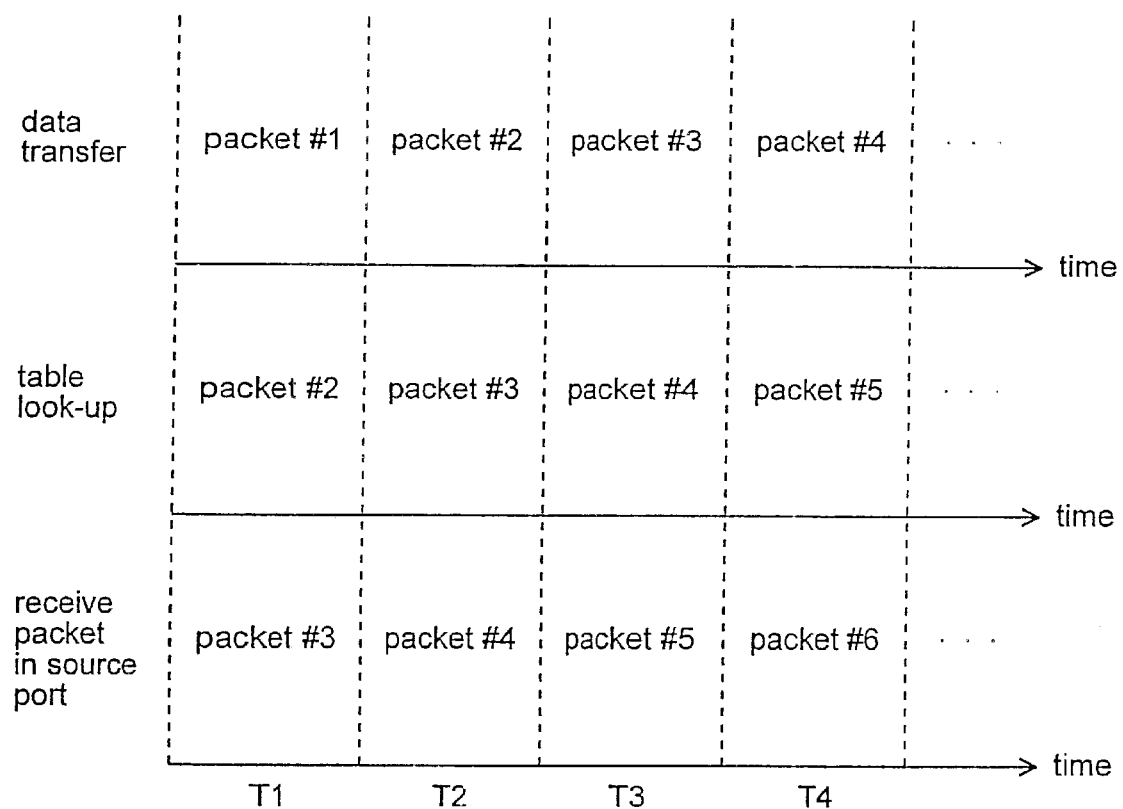
FIG. 10 illustrates a timing diagram for packets received by the multi-port bridge illustrated in FIG. 9.

FIG. 10 illustrates a timing diagram for packets received by the multi-port bridge 400 illustrated in FIG. 9. Reference is also made to FIG. 9 for the following discussion of FIG. 10. During a time period T1, a first packet (packet #1) is traversing the data bus 402 between a source port for the packet #1 and a destination port (cut-through) or between the source port and the packet buffers 412. During the same time period T1, a look-up and learning operation for a second packet (packet #2) can be performed via the look-up bus 404. In addition, a third packet (packet #3) can be received from a LAN segment into a source port for the packet #3 during the time period T1. Note that additional packets can be simultaneously received by other ports of the multi-port bridge 400.

When transfer of the packet #1 via the data bus 402 is completed, the packet #2 can then be transferred via the data bus 402. This occurs during a time period T2. Also during the time period T2, a look-up and learning operation for the packet #3 is performed via the look-up bus 404. A fourth packet (packet #4) can also be received into a source port for the packet #4 during the time period T2.

Similarly, during a next time period T3, the packet #3 can be transferred via the data bus 402, while a look-up and learning operation for the packet #4 is performed via the look-up bus 404 and while yet another packet (packet #5) is being received into a source port for the packet #5. This process continues as additional packets are received, look-up and learning operations are performed and packet data is transferred.

As will be apparent from the above discussion, the multi-port bridge 400 illustrated in FIG. 9 achieves greater packet handling capacity in comparison with the multi-port bridge 100 illustrated in FIG. 3 through increased parallelism in the processing of each packet. This is because data transfer and table look-up operations can be performed simultaneously via the data bus 402 and the look-up bus 404.

Receive Packet Vector FIFO in the Ports

Figure 11:
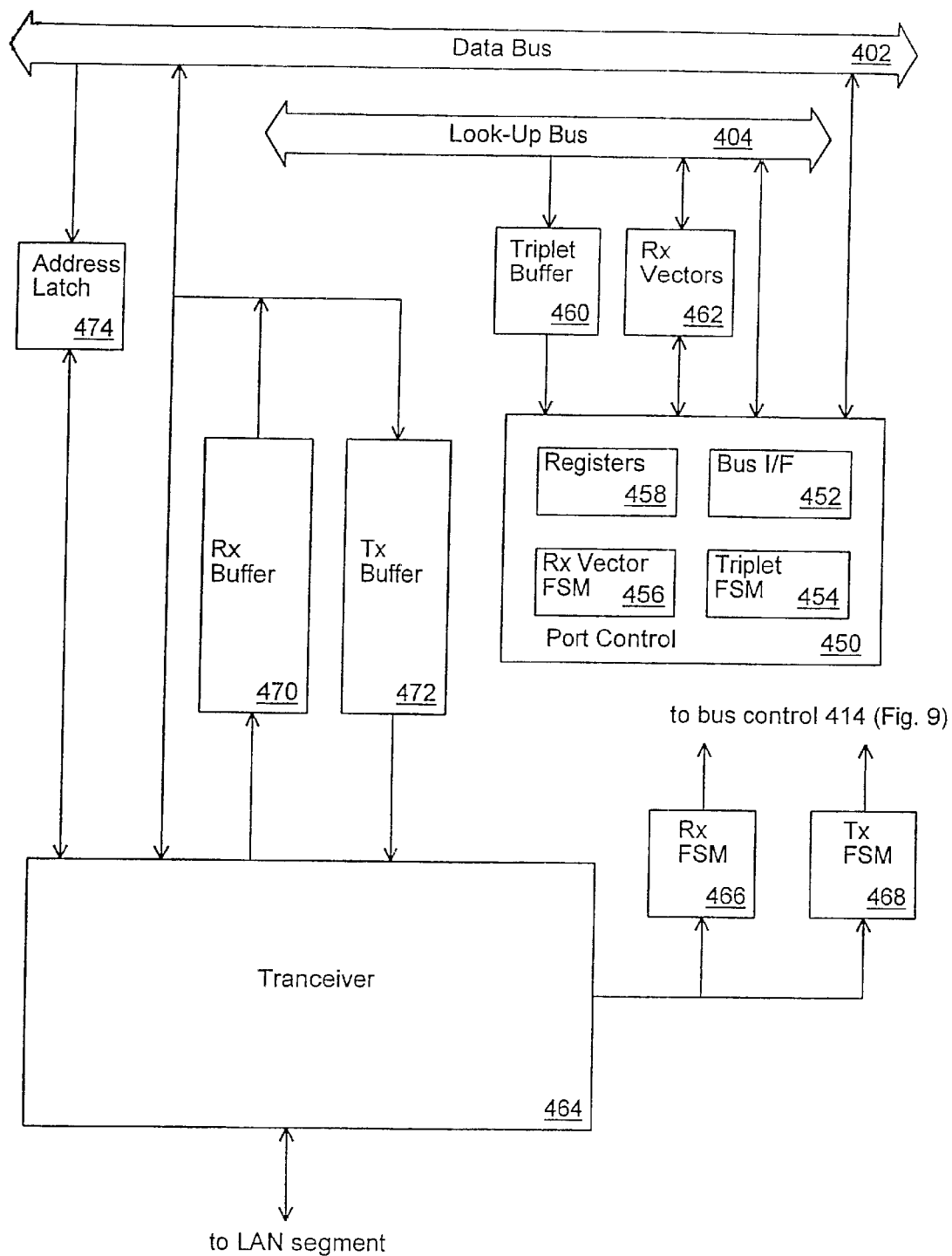
FIG. 11 illustrates a block schematic diagram of a port of the multi-port bridge illustrated in FIG. 9.

FIG. 11 illustrates a block schematic diagram of one of the ports 416–420 of the multi-port bridge 400 illustrated in FIG. 9. A port controller 450, including a bus interface 452, a triplet finite state machine 454, a receive vector finite state machine 456 and registers 458, provides control for the port and an interface between the port and the buses 402, 404. The port also includes a triplet FIFO buffer 460, coupled between the look-up bus 404 and the port controller 450, and a receive packet vector buffer 462 coupled between the look-up bus 404 and the port controller 450.

The port controller 450 monitors the data bus 402 and the look-up bus 404 for commands and data directed to the port and also provides commands and data to the buses 402, 404 as appropriate. Under control of the triplet finite state machine 454, the triplet buffer 460 stores a queue of memory pointers ("triplets"—illustrated in FIG. 5) for data packets being stored in the packet buffers 412 (FIG. 9) of the memory device 406 (FIG. 9). Under control of the receive vector finite state machine 456, the receive vector buffer 462 stores information ("receive vectors"—illustrated in FIG. 14 and explained in more detail herein) relating to the routing of packets received by the port. The term "vector" as used herein means a data structure in which information relating to the routing of a single packet through the multi-port bridge 400 (FIG. 9) is stored. Thus, unless otherwise indicated, the term "vector" includes a data structure having an, as yet, empty field for storing an identification of the destination port for the packet and also includes a data structure having a field which presently contains the identification of the destination port for the packet. The registers 458 contain data for initializing the port upon start-up and for collecting status information for the port.

The port also includes a medium access control (MAC) transceiver 464 which accesses a LAN segment associated with the port for transmitting data packets to, and receiving data packets from, the LAN segment. Coupled to the transceiver 464 are a receive finite state machine 466, for controlling the transceiver 464 during packet reception, and a transmit finite state machine 468, for controlling the transceiver 464 during packet transmission. The receive finite state machine 466 and the transmit finite state machine 468 are each coupled to the bus control module 414 (FIG. 9) for requesting access to the data bus 402 therefrom.

Packets received from the associated LAN segment by the transceiver 464 are directed to the packet data bus 402 through a receive FIFO buffer 470, while packets to be transmitted over the associated LAN segment are directed from the data bus 402 to the transceiver 464 through a transmit FIFO buffer 472. An address latch 474 is also included in the port for latching addresses from the data bus 402 and providing them to the transceiver 464.

Figure 12:
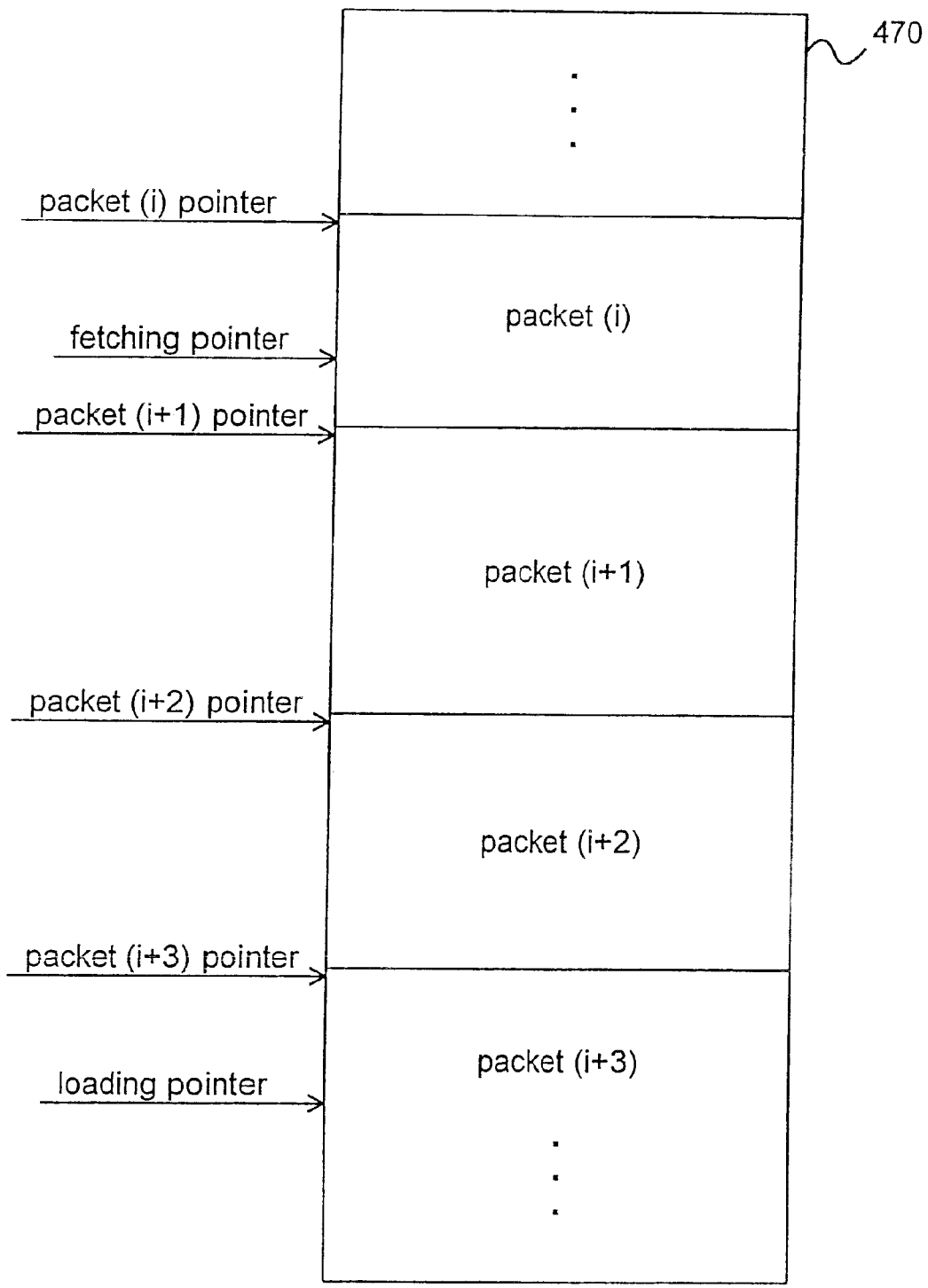
FIG. 12 illustrates a diagram of a receive buffer illustrated in FIG. 11.

FIG. 12 illustrates a diagram of the receive buffer 470 illustrated in FIG. 11. As shown in FIG. 12, a packet (i) is stored in successive locations of the receive buffer 470 starting at an address in the buffer 470 identified by a packet (i) pointer. A packet (i+1), received subsequently to the packet (i), is stored the receive buffer 470 following the packet (i). The packet (i+1) is stored in successive locations of the buffer 470 starting at an address identified by a packet (i+1) pointer. Similarly, a packet (i+2) and a packet (i+3) are stored in successive locations of the receive buffer 470 starting at locations identified by a packet (i+2) pointer and a packet (i+3) pointer, respectively.

As also shown in FIG. 12, a fetching pointer identifies a current location in the receive buffer 470 from which the packet (i) is currently being read and placed on the data bus 402 (FIGS. 9 and 11). Thus, once a packet is conditioned for transfer via the data bus 402 to the packet buffers 412 (FIG. 9) or directly to the destination port, the fetching pointer points at the starting address for the packet, and is then incremented as the packet is read from the buffer 470 and placed on the data bus 402. In addition, a loading pointer identifies a current location in the receive buffer 470 into which the packet (i+3), currently being received from the LAN segment associated with the port, is written. The loading pointer is incremented as the incoming packet is stored in successive locations of the receive buffer 470.

Unlike the receive buffer 216 illustrated in FIG. 4, the receive buffer 470 illustrated in FIGS. 11–12 can store more than one packet, preferably two to four packets of the minimum size specified by the IEEE 802.3 standard. It will be apparent, however, that the size of the receive buffer 470 can be altered while achieving the advantages of the present invention.

Figure 13:
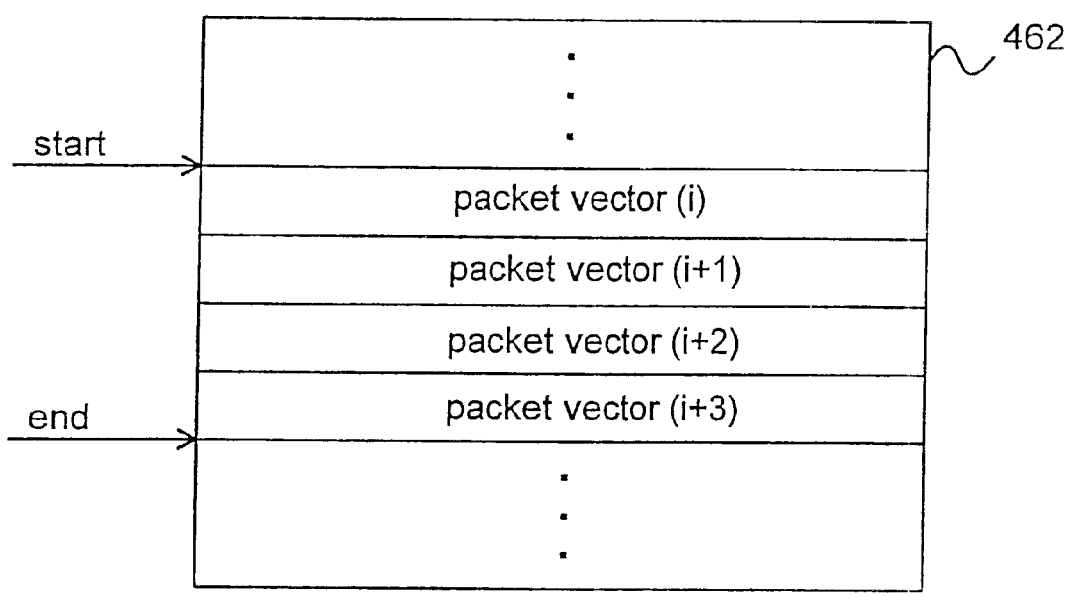
FIG. 13 illustrates a diagram of a receive packet vector buffer illustrated in FIG. 11.

FIG. 13 illustrates a diagram of the receive packet vector buffer 462 illustrated in FIG. 11. The vector buffer 462 stores one receive packet vector (FIG. 14) for each packet stored in the receive buffer 470. Thus, a packet vector (i) stored in the vector buffer 462 corresponds to the packet (i) illustrated in FIG. 12. Similarly, the vector buffer 462 stores a packet vector (i+1), a packet vector (i+2) and a packet vector (i+3), corresponding to the packet (i+1), the packet (i+2) and the packet (i+3) illustrated in FIG. 3, respectively.

Figure 14:
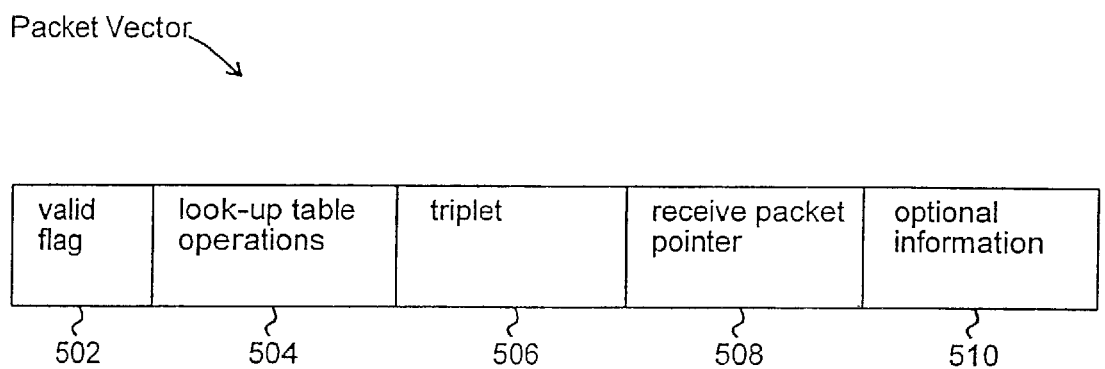
FIG. 14 illustrates a receive packet vector according to the present invention.

FIG. 14 illustrates a receive packet vector according to the present invention. The packet vector includes a first field 502 in which a vector valid flag is stored. The logic level of the vector valid flag indicates whether the remaining fields of the packet vector are valid. Next, the packet vector includes a field 504 in a which information relating to look-up table operations for the packet are stored. For example, information in the field 504 can indicate whether a learning operation needs to be performed for the packet and can also indicate whether a look-up operation for the packet is complete. The packet vector includes a field 506 for storing a triplet for the packet, including the source port, destination port and starting address in the packet buffers 412 assigned to the packet. In addition, the field 506 can store the length of the packet and a receive status for the packet. A field 508 of the packet vector stores a receive packet pointer for the packet. As mentioned, the receive packet pointer identifies a starting location in the receive buffer 470 for the packet. Finally, the packet vector optionally includes a field 510 for storing additional information about the packet. For example, the field 510 can store a virtual-LAN (v-LAN) tag for the packet or an indication of a priority assigned to the packet.

As discussed herein, the arrangement of the port illustrated in FIG. 11, including the receive buffer 470, which can preferably store two or more packets, and including the receive packet vector buffer 462, achieves an advantage over the arrangement of the port illustrated in FIG. 4, in that operations for multiple data packets received by the port can be performed simultaneously (in parallel), thus, increasing the packet handling capacity of the multi-port bridge.

Parallel Operations for Packet Bridging

For the following discussion, reference is made to FIGS. 9–14. As a packet is received by a source port for the packet, such as is illustrated in FIG. 11, the packet is loaded into the receive packet buffer 470 (FIGS. 11–12) under control of the receive finite state machine 466 (FIG. 11). The packet is loaded in the packet buffer 470 starting at a next location in the buffer 470 following a previous packet. This is shown in FIG. 12 where the packet (i+3) is being written to the receive buffer 470 following the packet (i+2) in accordance with the loading pointer. The starting address in the receive buffer 470 is identified by a packet pointer assigned to the packet. As the packet is received and stored in successive locations of the receive buffer 470, the loading pointer is incremented. Once the loading process for a packet commences, a packet vector is assigned to the packet and initialized under control of the receive vector finite state machine 456 (FIG. 11). The packet vector is initialized by conditioning the field 502 (FIG. 14) of the packet vector to indicate that the packet vector is valid, conditioning the field 504 to indicate that a look-up operation needs to be performed and by storing the packet pointer in the field 508 (FIG. 14).

Then, once the source address and destination address for the packet have been received from the segment of the LAN associated with the source port for the packet, look-up and learning operations are performed for the packet. The port requests access to the look-up bus 404 for this purpose. Once access to the look-up bus 404 is granted, look-up and learning operations are performed for the packet. During the learning operation, the look-up tables are updated in the memory device 408 (FIG. 9). During the look-up operation, the destination port for the packet is identified. In addition, a starting address in the packet buffers 412 (FIG. 9) is assigned to the packet. Accordingly, a triplet (FIG. 5) for the packet is formed. The triplet is then placed on the look-up bus 404 (FIGS. 9, 11). The port that is receiving the packet then stores the triplet in the field 506 (FIG. 14) of the packet vector for the packet. In addition, the field 504 is conditioned to reflect that the look-up and learning operations are complete.

The look-up and learning operations for the packet can be performed while the packet is still being received into the receive buffer 470 (FIG. 11), however, the look-up and learning operations can also be postponed until after the packet is entirely loaded in the receive buffer 470 in the event that access to the look-up bus 404 is not immediately granted. For example, if not already completed, look-up and learning can be performed for the packet (i+1) or the packet (i+2) while the packet (i+3) is being loaded into the receive buffer 470. As illustrated in FIG. 12, these packets are completely loaded into the receive buffer 470.

Once the look-up and learning operations for a packet are complete, as indicated in the field 504 (FIG. 14) of the packet vector for the packet, and assuming the packet has been queued for transfer from the receive buffer 470 (FIGS. 11, 12) for the longest time (or has the highest priority, as indicated in the field 510 for the packet), then the receive finite state machine 466 (FIG. 11) requests access to the data bus 402 (FIGS. 9, 11). Once access is granted, the packet is transferred from the receive buffer 470 to the packet buffers 412 (FIG. 9). If not currently busy transmitting another packet, the destination port for the packet receives the packet from the data bus 402 into its transmit buffer 472 (FIG. 11) while the packet is being loaded into the packet buffers 412 (cut-through). Otherwise, the destination port retrieves the packet from the packet buffers 412 once it is no longer busy.

In addition, while look-up and learning operations are being performed for a packet, a data transfer operation can be simultaneously performed for a prior packet. For example, while a look-up operation is being performed for the packet (i+3), a packet vector previously completed for the packet (i) can be utilized to transfer the packet (i) to the packet buffers 412 (FIG. 9) and, if the destination port is available, directly to the destination port for the packet (i) (cut-through).

The arrangement of the port illustrated in FIG. 11, including the receive buffer 470, which can preferably store two or more packets, and the receive packet vector buffer 462, is preferably utilized in a multi-port bridge 400 having a data bus 402 and a look-up bus 404 which operate independently. It will be apparent, however, that a port having a receive buffer 470 which can store two or more packets and having a receive packet vector buffer 402, can be utilized in a multi-port bridge having a single, time-division multiplexed bus, such as the bus 102 (FIGS. 3–4).

The receive buffer 470 should be large enough to store two or more relatively small packets, such as packets of the minimum size specified by the IEEE 802.3 standard, as these small packets require the most overhead operations, such as for look-up and learning, in comparison to the amount of data transferred by the packet (i.e. these packets have a high ratio of overhead to payload). Because the arrangement of the port illustrated in FIG. 11 improves packet handling capacity of the multi-port bridge 400 (FIG. 9) by eliminating overhead operations from the data transfer path through the multi-port bridge 400, the performance of the multi-port bridge 400 is improved dramatically, though the size of the receive buffer 470 need not be increased dramatically. This minimizes the amount of silicon space required to implement the port illustrated in FIG. 11 as a portion of an integrated circuit. It will be apparent, however, that the size of the receive buffer 470 can be altered while still achieving the principle advantages of the present invention. For example, the receive buffer 470 can be sized to hold two or more relatively large packets, such as a packet of the maximum size specified by the IEEE 802.3 standard.

Transparent Bus Partition

Figure 15:
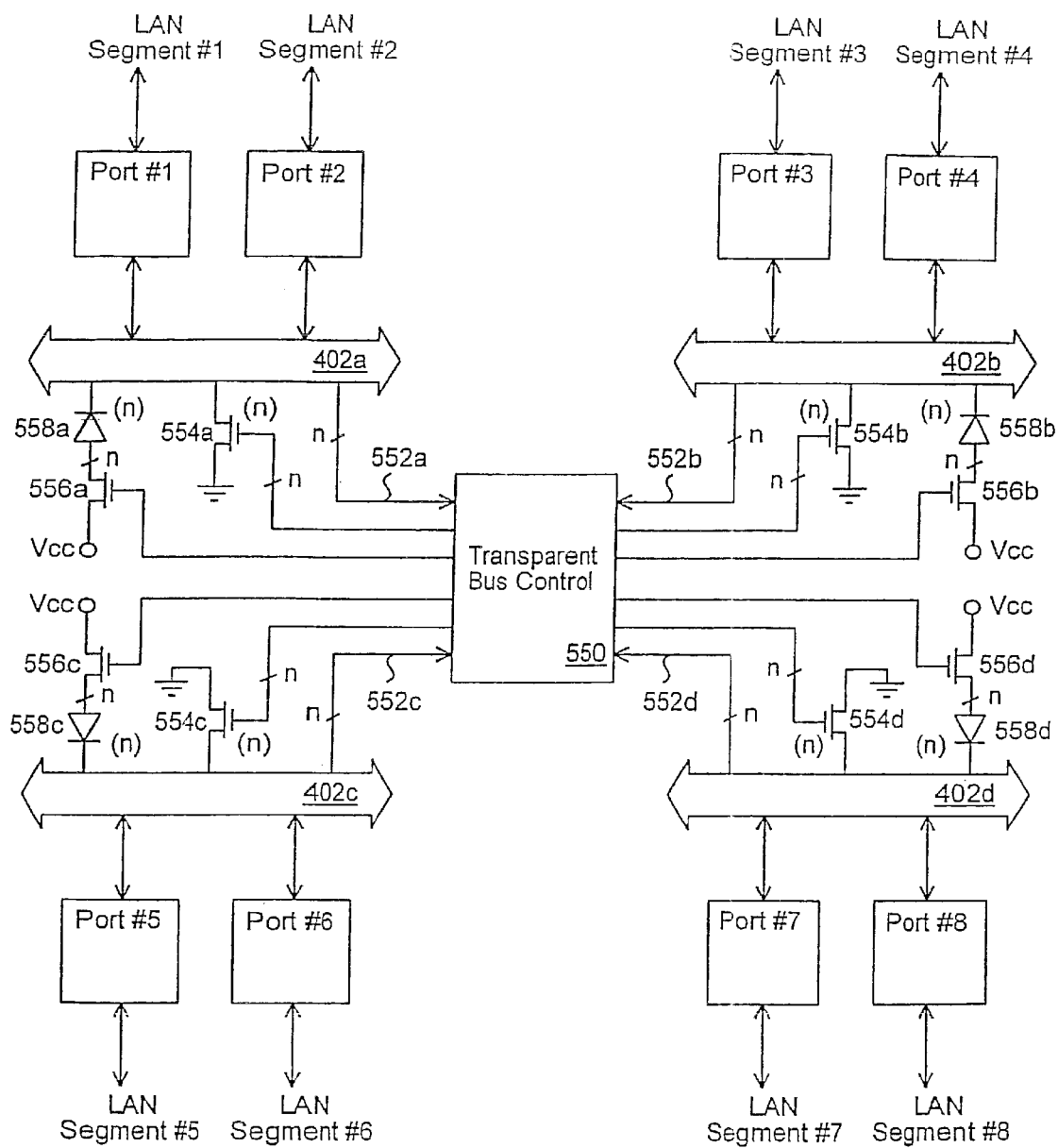
FIG. 15 illustrates a transparently partitioned bus according to the present invention.

FIG. 15 illustrates a transparently partitioned bus according to the present invention. FIG. 15 differs from FIG. 9 in that the data bus 402 of FIG. 9 is partitioned into four bus segments 402a, 402b, 402c and 402d in FIG. 15. Each bus segment 402a, 402b, 402c and 402d includes a same number (n) of signal lines; preferably, thirty-two data lines in addition to command lines. One or more ports is coupled to each bus segment 402a, 402b, 402c and 402d. For example, Port #1 and Port #2 are coupled to the bus segment 402a; Port #3 and Port #4 are coupled to the bus segment 402b; Port #5 and Port #6 are coupled to the bus segment 402c and Port #7 and Port #8 are coupled to the bus segment 402d. In addition, a packet buffer memory 412 (illustrated in FIG. 9) can be coupled to one of the bus segments 402a, 402b, 402c or 402d of FIG. 15 for temporarily storing data packets being bridged from one port to another. The packet buffer memory 412 (FIG. 9) can replace one or more of the ports coupled to its bus segment or can be coupled to the bus segment in addition to the corresponding ports.

Because each bus segment 402a, 402b, 402c and 402d is coupled to fewer than all of the ports, the signal lines of each bus segment 402a, 402b, 402c and 402d can be physically shorter in length than if the signal lines were coupled to all of the ports, as is the case for the data bus 402 illustrated in FIG. 9. Because the signal lines are shorter in length, each has lower resistance and capacitance and, thus, R-C time constants associated with the signal lines of each bus segment 402a, 402b, 402c and 402d are lower than would be the case for a non-partitioned bus. For example, because the resistance and capacitance associated with a signal line each increases approximately linearly with length, assuming the bus segment 402a is one-fourth of the length of the data bus 402 (FIG. 9), then the R-C time constants for the signal lines of the bus segment 402a are approximately one-sixteenth the value of the R-C time constants for the signal lines of the data bus 402 (FIG. 9). In addition, the signal lines of the bus segments 402a, 402b, 402c and 402d are less heavily loaded because there are fewer ports coupled to each bus segment. These lower R-C time constants and lighter loading allow the partitioned bus illustrated in FIG. 15 to transfer data in accordance with a significantly higher frequency clock signal than the data bus 402 (FIG. 9).

A transparent bus controller 550 is coupled each bus segment 402a, 402b, 402c and 402d via pluralities of (n) sense lines 552a, 552b, 552c and 552d, respectively. Each group of (n) sense lines 552a, 552b, 552c and 552d includes one sense line coupled to each signal line of the corresponding bus segment. The sense lines 552a, 552b, 552c and 552d provide an indication to the transparent bus controller 550 of the logic level of each signal line of each bus segment 402a, 402b, 402c and 402d.

In addition, groups of (n) transistors 554a, 554b, 554c and 554d, one transistor for each signal line of each bus segment 402a, 402b, 402c and 402d, respectively, are coupled between the respective signal line and ground. For illustration purposes, only a single transistor is shown coupled between each bus segment 402a, 402b, 402c and 402d and ground, though it will be understood that a plurality of (n) transistors are coupled between each bus segment and ground, one transistor coupled to each signal line. The gate of each of the transistor of each group 554a, 554b, 554c and 554d is coupled to be independently controlled by the transparent bus controller 550 such that any signal line, or any combination of signal lines, of the bus segments 402a, 402b, 402c and 402d can be selectively shunted to ground.

Further, a transistor 556a, a transistor 556b, a transistor 556c and a transistor 556d, are each coupled between a logic high voltage ($V_{CC}$) and anodes of groups of (n) diodes 558a, 558b, 558c and 558d, respectively. Thus, each of the four transistors 556a, 556b, 556c and 556d, one for each bus segment 402a, 402b, 402c and 402d, respectively, is coupled to the anodes of (n) diodes. For illustration purposes, a single diode is shown for each bus segment, though it will be understood that a plurality of (n) diodes, one for each signal line, are coupled to each of the transistors 556a, 556b, 556c and 556d. A cathode of each diode of each of the groups 558a, 558b, 558c and 558d is coupled to a respective one of the signal lines of each bus segment 402a, 402b, 402c and 402d. The gate of each of the four transistors 556a, 556b, 556c and 556d is coupled to be controlled by the transparent bus controller 550 such that all the signal lines of each bus segment 402a, 402b, 402c and 402d, can be simultaneously shunted to $V_{CC}$.

Figure 16:
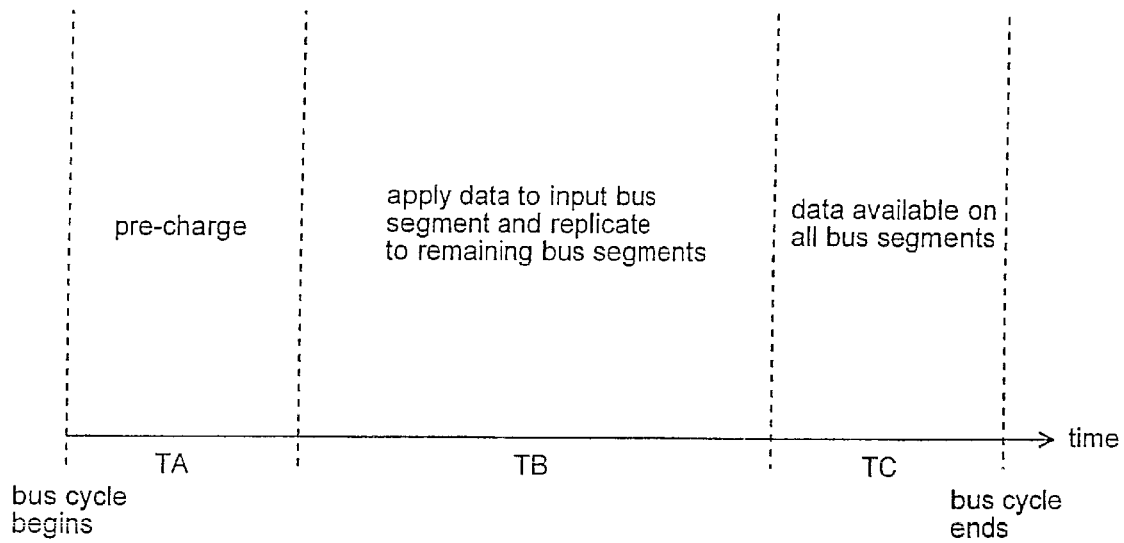
FIG. 16 illustrates a timing diagram for transferring data via the transparently partitioned bus illustrated in FIG. 15.

FIG. 16 illustrates a timing diagram for transferring data via the partitioned bus illustrated in FIG. 15. A single bus cycle for transferring data from one port to another port (or to a packet buffer) includes three time periods TA, TB and TC. Because each bus segment 402a, 402b, 402c and 402d (FIG. 15) preferably includes 32 data lines, 32 bits of data can be transferred during each bus cycle.

During the time period TA, the transparent bus controller 550 (FIG. 15) pre-charges each signal line of each bus segment 402a, 402b, 402c and 402d (FIG. 15) to a logic high voltage level ($V_{CC}$) by activating the four transistors 556a, 556b, 556c and 556d (FIG. 15), respectively. Current flows from the voltage supply $V_{CC}$ to each signal line through the transistors 556a, 556b, 556c and 556d and the respective groups of diodes 558a, 558b, 558c and 558d. Because the pre-charging operation includes all the signal lines of each bus segment 402a, 402b, 402c and 402d, no combinational logic operations are required to be performed during the time period TA with respect to individual signal lines. In the preferred embodiment, the transistors 556a, 556b, 556c and 556d are formed of sufficient size to rapidly pre-charge all the signal lines. As such, pre-charging of all the signal lines can be accomplished in a relatively short time period. Upon completion of pre-charging, the transistors 556a, 556b, 556c and 556d are deactivated.

The ports request access to the partitioned bus from the transparent bus controller 550 which grants access to the partitioned bus according to an appropriate priority. During the time period TB, a port having previously been granted access to the partitioned bus applies the data to be communicated to its associated bus segment by applying an appropriate logic level to each signal line of its associated bus segment. The transparent bus controller 550 then senses the data applied by the port via the sense lines 552a, 552b, 552c or 552d coupled to the appropriate bus segment. In the preferred embodiment, sensing of the signal lines is performed by the transparent bus controller 550 simultaneously as the port having access to the transparent bus places data on its associated bus segment. Then, the transparent bus controller 550 replicates this data to each other bus segment by discharging appropriate ones of the signal lines of each other bus segment via appropriate ones of the transistors 554a, 554c, 554c and 554d. This is accomplished by the transparent bus control logic 550 monitoring the sense lines of bus segment coupled to the port having control of the transparent bus, and once the voltage level of a signal line falls below a predetermined threshold, the corresponding signal lines of the other bus segments are immediately discharged. This technique results in the data being replicated to the other bus segments in a relatively short period of time.

For example, assume Port #4 (FIG. 15) is granted access to the partitioned bus. During the time period TB, Port #4 applies the data to be communicated, such as a 32-bit portion of an IEEE 802.3 data packet, to its associated bus segment 402b (FIG. 15). The transparent bus control logic 550 (FIG. 15) simultaneously monitors the bus segment 402b via the sense lines 552b (FIG. 15). Once the bus control logic 550 determines the logic levels of the signal lines of the bus segment 402b, the bus control logic 550 replicates these logic levels on the bus segments 402a, 402c and 402d, by activating appropriate ones of the transistors 554a, 554c and 554d, thereby discharging the appropriate signal lines to a logic low voltage. No action is taken relative to signal lines of the bus segments 402a, 402c and 402d which are a logic high voltage as these signal lines simply remain charged by the pre-charging operation performed during the time period TA.

During the time period TC, the identical data is available from any of the bus segments 402a, 402b, 402c and 402d. Accordingly, the recipient of the data receives the data during the time period TC. Upon conclusion of the bus cycle at the end of the time period TC, a subsequent bus cycle commences, starting with the time period TA.

Accordingly, the bus is "transparently" partitioned such that the bus segments 402a, 402b, 402c and 402d, in conjunction with the transparent bus controller 550, form a single logical bus by which the ports communicate data. A principle advantage of this aspect of the present invention is that the entire bus cycle, including the time periods TA, TB and TC, can be made shorter than a bus cycle for a non-partitioned bus. Although four bus segments 402a, 402b, 402c and 402d, each having two ports, are illustrated in FIG. 15, it will be apparent that the number of bus segments, and the number of ports coupled to each bus segment, can be altered. In addition, a look-up bus 404 (FIG. 9) can be coupled to each of the ports illustrated in FIG. 15 for performing look-up and learning operations utilizing an associated memory device 408 (FIG. 9).

Staged Partitioned Bus

Figure 17:
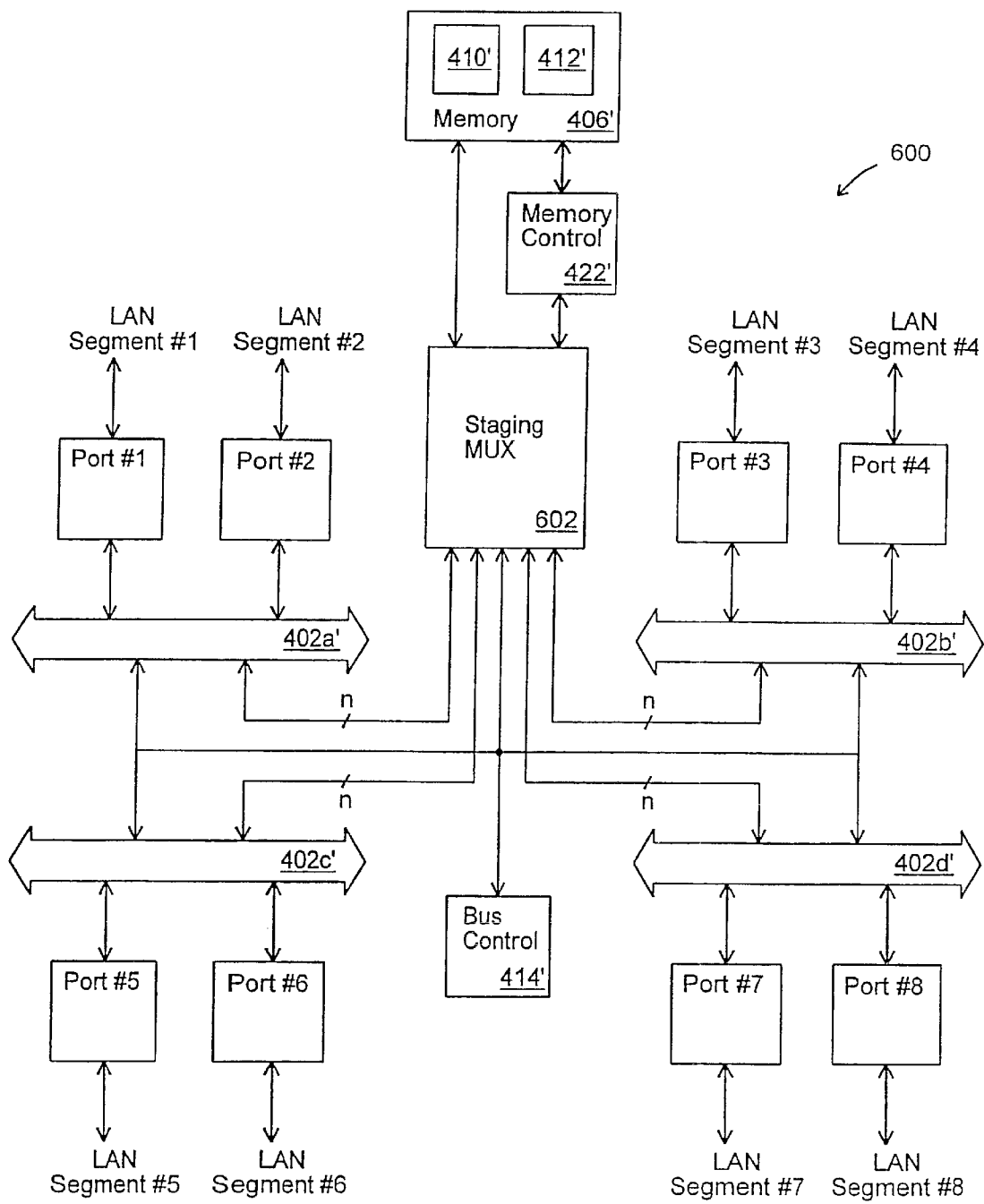
FIG. 17 illustrates a multi-port bridge according to the present invention having a staged partitioned bus.

FIG. 17 illustrates a multi-port bridge 600 having a staged partitioned bus according to the present invention. The multi-port bridge 600 illustrated in FIG. 17 differs from that illustrated in FIG. 9 in that the data bus 402 of FIG. 9 is partitioned into four bus segments 402a', 402b', 402c' and 402d' in FIG. 17. Each bus segment 402a', 402b', 402c' and 402d' is operable independently of the others and includes a same number (n) of signal lines; preferably, thirty-two data lines in addition to command lines. One or more ports are coupled to each bus segment 402a', 402b', 402c' and 402d'. For example, Port #1 and Port #2 are coupled to the bus segment 402a'; Port #3 and Port #4 are coupled to the bus segment 402b'; Port #5 and Port #6 are coupled to the bus segment 402c' and Port #7 and Port #8 are coupled to the bus segment 402d'. Though four bus segments 402a', 402b', 402c' and 402d' are illustrated in FIG. 17, each having two ports, it will be apparent that a different number of bus segments can be provided and that each bus segment can be coupled a different number of ports.

Each bus segment 402a', 402b', 402c' and 402d' is coupled to a staging multiplexer (MUX) 602 and to a bus control module 414'. In addition, the staging MUX 602 is coupled to the bus control module 414', to a memory controller 422' and to a memory device 406'. The memory controller 422' provides an interface between the memory device 406' and the staging MUX 602. The memory device 406' includes mailboxes 410' for exchanging information between an external processor (not shown) and the multi-port bridge 600 and also includes a packet buffer memory 412' for temporarily storing data packets undergoing bridging from one port to another.

The bus control module 414' receives requests from the ports for access to the memory device 406' and grants such requests according to an appropriate priority. In addition to notifying a port when that port is granted access to the memory device 406', the bus control module 414' conditions the staging MUX 602 so as to provide a signal path to the memory device 406' for the port. Accordingly, a bi-directional communication path is formed between the port and the memory device 406' via the associated one of the bus segments 402a', 402b', 402c' and 402d' and through the MUX 602. This bi-directional signal path can be utilized for storing data packets and other information in the memory device 406' and for retrieving data packets and other information from the memory device 406'.

Similarly to the transparently partitioned bus illustrated in FIG. 15, because each bus segment 402a', 402b', 402c' and 402d' of the staged partitioned bus illustrated in FIG. 17 is coupled to fewer than all of the ports, the signal lines of each bus segment 402a', 402b', 402c' and 402d' can be physically shorter in length than the signal lines of the data bus 402 illustrated in FIG. 9. This results in lower R-C time constants for the bus segments 402a', 402b', 402c' and 402d'. In addition, the signal lines of the bus segments 402a', 402b', 402c' and 402d' are less heavily loaded than those illustrated in FIG. 9 because there are fewer ports coupled to each bus segment. These lower R-C time constants and lighter loading allow the staged partitioned bus illustrated in FIG. 17 to transfer data in accordance with a significantly higher frequency clock signal than the data bus 402 illustrated in FIG. 9.

The bus arrangement illustrated in FIG. 17 differs from that illustrated in FIG. 15 in that no provision is made in the preferred embodiment of the arrangement illustrated in FIG. 17 for cut-through of data packets from one of the bus segments 402a', 402b', 402c' or 402d' to another. Thus, according to the invention illustrated in FIG. 17, data packets cannot be communicated directly from one bus segment to another without first being temporarily stored in the memory device 406'. This is because in the preferred embodiment, the staging MUX 602 only provides a communication path between one of the bus segments 402a', 402b', 402c' or 402d', and the memory device 406' for storing or retrieving packets, but does not provide a communication path directly between any two or more of the bus segments 402a', 402b', 402c' or 402d'. However, it will be apparent that cut-through can be accomplished for communicating packets directly between ports coupled to a same one of the bus segments 402a', 402b', 402c' or 402d'. It will also be apparent that the staging MUX 602 can be modified to provide a communication path directly between any two or more of the bus segments 402a', 402b', 402c' or 402d'. The arrangement illustrated in FIG. 17 provides an advantage over that illustrated in FIG. 15 in that fewer circuit elements as required. For example, the transistors 554a–554d, the transistors 556a–556d and the diodes 558a–558d illustrated in FIG. 15 are unnecessary in the arrangement of FIG. 17.

In addition, a look-up bus 404' (FIG. 18); an associated memory device 408' (FIG. 18) and memory controller 428' (FIG. 18) can be included for performing look-up and learning operations simultaneously as data packets are transferred via the staged partitioned bus in accordance with the present invention. For example, FIG. 18 illustrates a multi-port bridge 600' having a staged partitioned data bus, including two bus segments 402a' and 402b', and a look-up bus 404'.

Figure 18:
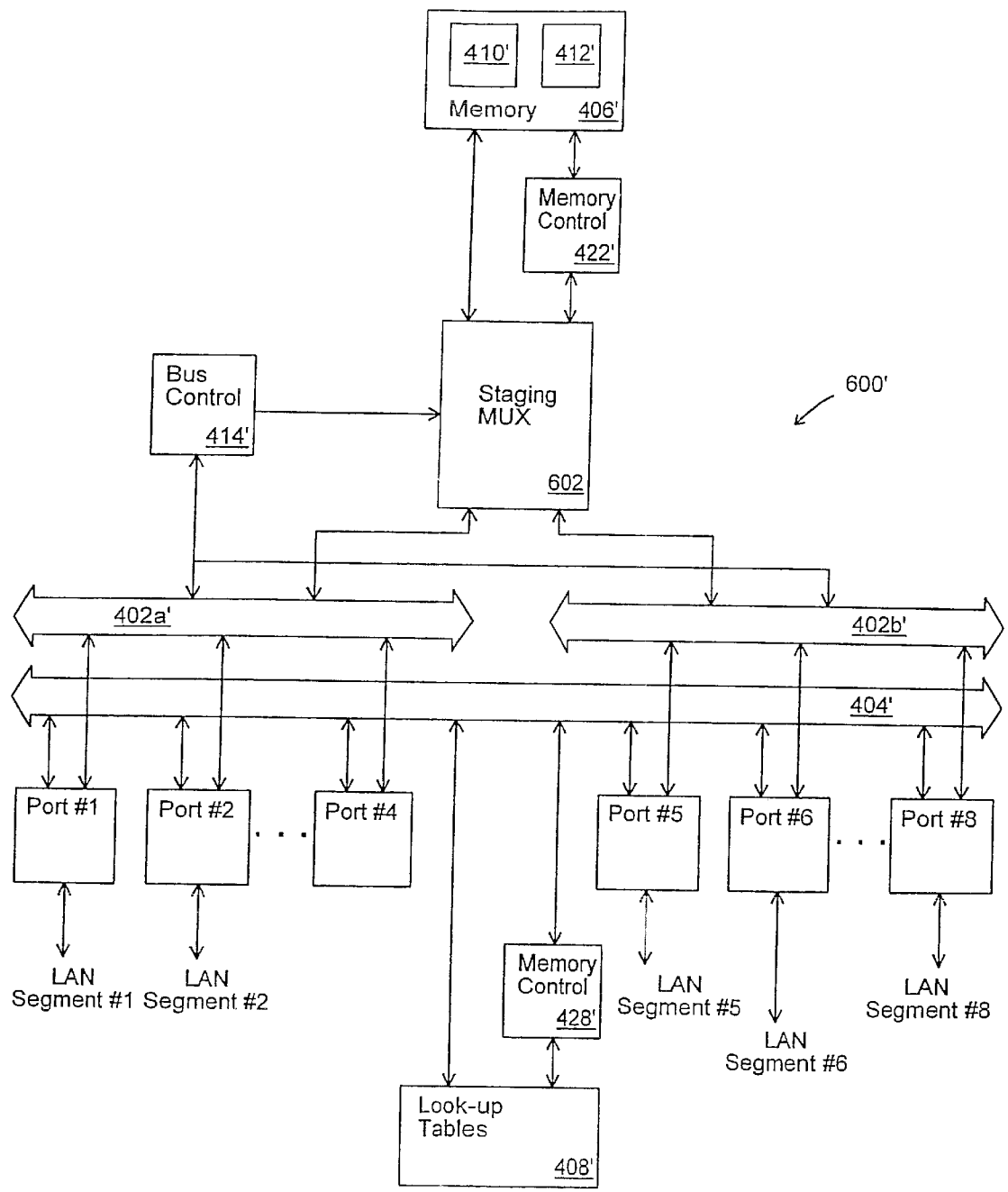
FIG. 18 illustrates a multi-port bridge having a staged partitioned data bus and a look-up bus.

Assume a data packet is received by a port, for example, the port #4 coupled to the data bus segment 402a' illustrated in FIG. 18. The port #4 identifies an appropriate destination port for the packet via the look-up bus 404' by looking up the destination address for the packet in the look-up tables 408'. Assume the destination port identified for the packet is the port #6, which is coupled to the data bus segment 402b' illustrated in FIG. 18. A result of the look-up operation is a triplet (FIG. 5) which is stored in a triplet buffer 206 (FIG. 4) of the port #6. Then, the port #4 requests access to the memory device 406' from the bus control module 414'. The bus control module 414' grants access to the port #4 by conditioning the staging multiplexer 602 to provide a signal path from the port #4 (and the bus segment 402b') to the memory device 406' through the multiplexer 602. The port #4 then stores the data packet in the packet buffers 412' of the memory device 406'.

When the port #6 is available for transmitting the data packet, the port #6 requests access to the memory device 406' from the bus control module 414'. When such access is granted, the memory control module 414' conditions the multiplexer 602 so as to provide a signal path from the port #6 (and the bus segment 402c') to the memory device 406' through the multiplexer 602. The port #6 then retrieves the data packet from the packet buffers 412' and transmits the packet to its associated segment of the LAN.

Assume, however, that the destination port for the data packet is the port #2, rather than the port #6. The port #2 is coupled to same data bus segment 402a' as the port #4. Accordingly, if the port #2 is not currently busy transmitting when the port #4 stores the data packet in the packet buffers 412', the port #2 preferably receives the packet directly from the port #4 via the data bus segment 402' (cut-through).

Optimized Cut-Through for Broadcast and Multi-cast Packets

A broadcast packet is one that is intended by its originating node to be received by every other node of the LAN. Accordingly, when a multi-port bridge receives a broadcast packet, the packet is preferably directed to every port of the multi-port bridge (except the port that received the packet). Typically, a broadcast packet is identified by a destination address which is a series of logic ones (e.g., hexadecimal: FF FF FF FF FF FF). An example of a broadcast packet is a "keep alive" packet. In accordance with the IEEE 802.3 standard, each node periodically broadcasts a "keep alive" packet which informs the other nodes of the LAN of the continued presence of the sending node in the LAN.

A multi-cast packet is one that is intended to be received by each of a selected group of nodes of a LAN. For example, a virtual LAN (VLAN) may include a subset of nodes of a larger LAN. When a node included in the VLAN group sends a packet, the packet can be multi-cast to each other member of the VLAN group. Typically, a multi-cast packet is identified when the first bit of its destination address is a logical one. The source address of a multi-cast packet identifies the originating node which can then be utilized to identify the VLAN group of which the originating node is a member.

A uni-cast packet is one which is intended to be received by a single destination node. Typically, a uni-cast packet is identified by the first bit of the destination address for the packet being a logical zero. The destination node for the uni-cast packet is identified by the remaining bits of the destination address included in the packet.

Referring to FIG. 3, during the look-up operation for a packet received by a port (source port) of the multi-port bridge 100, the packet is examined to determine whether the packet is intended to be broadcast to all nodes of the LAN, whether the packet is intended for a VLAN group and whether the packet is intended for a single destination node. If the packet is intended to be broadcast to all the nodes of the LAN, the packet is directed to all the ports of the multi-port bridge 100 (or to all the ports other than the source port). If the packet is intended for a VLAN group, the packet is a multi-cast packet. In which case, the source node address for the packet is utilized to access an appropriate entry in a VLAN portion of the look-up tables 154. Each entry in the VLAN portion of the look-up tables 154 identifies the destination ports for the packet according to the source node address for the packet. If the packet is intended for a single destination node, information stored in the look-up tables 154 during learning operations for prior packets is utilized to identify an appropriate destination port for the packet. If the look-up tables 154 do not identify the appropriate port, the packet is treated as a broadcast packet or a multi-cast packet depending upon how the multi-port bridge 100 is pre-conditioned.

According to an embodiment of the present invention, if a destination port for a broadcast or a multi-cast packet is not currently busy when the packet is stored in the packet buffers 156, the packet is also received by the destination port directly from the source port (i.e. the packet is cut-through). If a destination port is busy transmitting another packet, however, that port will retrieve the packet from the packet buffers 156 (FIG. 3) later, when the port is no longer busy. Accordingly, if multiple destination ports are busy when the packet is stored in the buffers 156, each of these ports retrieves the packet from the packet buffers 156 later, when it is no longer busy. Thus, the packet will appear on the communication bus 102 (FIG. 3) several times, once when the packet is transferred to the packet buffers 156 and an additional time for each destination port that was unable to receive the packet directly from the source port. Similarly, when a broadcast or multi-cast packet is received by a source port of the multi-port bridge 400 (FIG. 9), the packet may appear on the data bus 402 (FIG. 9) several times, once for each destination port which was unable to receive the packet directly from the source port.

These multiple appearances of the same packet on the communication bus 102 (FIG. 3) or on the data bus 402 (FIG. 9) tend to consume valuable bandwidth capacity of the respective bus. This is especially true of broadcast packets since broadcast packets are always directed to multiple destination ports and are required by the IEEE 802.3 specification to be sent throughout the LAN with regularity.

In accordance with another embodiment of the present invention, a memory store is provided in each port for receiving and storing broadcast and multi-cast packets, even when the port is busy transmitting another packet. Then, when the port is no longer busy, the broadcast or multi-cast packet is transmitted by the port without the port first having to retrieve the broadcast packet from a location apart from the port. Bandwidth is conserved because appearance of the broadcast or multi-cast packet on a bus which interconnects the ports is minimized.

Figure 19:
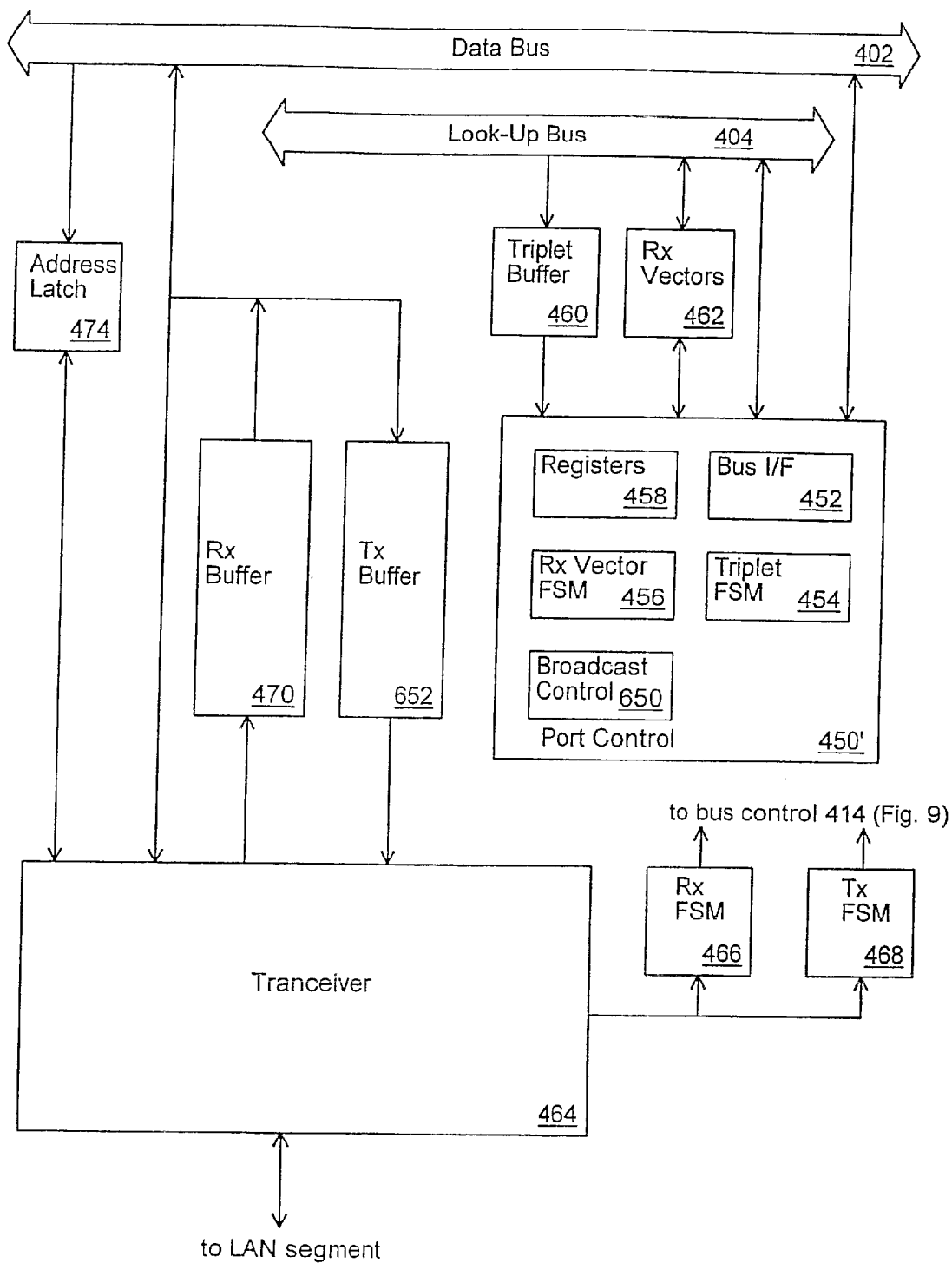
FIG. 19 illustrates a block schematic diagram of a port in accordance with the present invention for improving cut-through of broadcast and multi-cast packets.

FIG. 19 illustrates a block schematic diagram of a port of a multi-port bridge in accordance with the present invention. The port illustrated in FIG. 19 is preferably utilized in the multi-port bridge 400 illustrated in FIG. 9, but can also be utilized in the multi-port bridge 100 illustrated in FIG. 3, with appropriate modifications. The port illustrated in FIG. 19 is preferably identical to the port illustrated in FIG. 11 except as described herein. For example, a port controller 450' of the port illustrated in FIG. 19 includes a broadcast packet controller 650 which is not illustrated in FIG. 11. In addition, the transmit buffer 472 illustrated in FIG. 11 is replaced in FIG. 19 with a transmit buffer 652.

Figure 20:
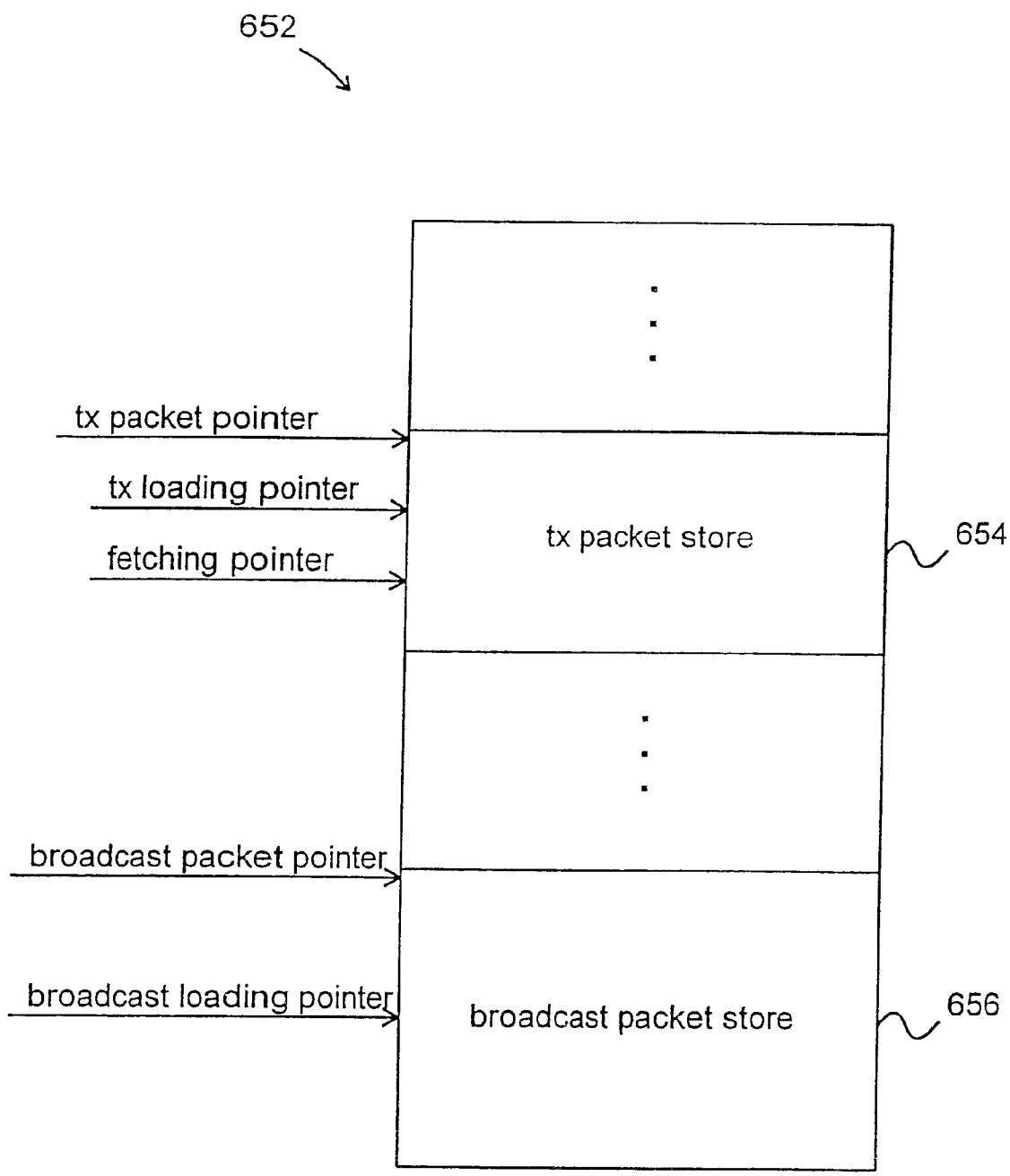
FIG. 20 illustrates a diagram of a transmit buffer illustrated in FIG. 20.

FIG. 20 illustrates a diagram of the transmit buffer 652 illustrated in FIG. 19. As shown in FIG. 20, a packet, such as a uni-cast packet, a broadcast packet or a multi-cast packet, can be stored in a transmit packet store 654 which is a portion of the transmit buffer 652 allocated for this purpose. A transmit packet pointer marks a first location of a packet being stored in the transmit packet store 654. A transmit loading pointer keeps track of a current location into which the packet is currently being written to, while a fetching pointer keeps track of a current location from which the packet is being read from. The transmit finite state machine 468 (FIG. 19) controls writing data to, and reading data from, the transmit packet store 654. In the preferred embodiment, each packet written to the transmit packet store 654 is also read out from the transmit packet store 654 and transmitted to a LAN segment associated with the port while the packet is still be written to the transmit packet store 654. For this reason, the transmit packet store 654 need not be capable of storing an entire IEEE 802.3 data packet of the maximum size.

In addition, the transmit buffer 652 includes a broadcast packet store 656 for storing broadcast and multi-cast packets when a such a packet is received while the port is busy transmitting another packet from the transmit packet store 654. In the preferred embodiment, the broadcast packet controller 650 (FIG. 19) is normally dormant and becomes active only when: (1) the transceiver 464 (FIG. 19) of the port is currently busy transmitting a packet; (2) a broadcast or multi-cast packet is being received by another port (source port); and (3) the broadcast packet store 656 is empty. When these conditions are all present, the broadcast packet controller 650 writes the broadcast packet into the broadcast packet store 656 of the port (destination port) when the packet appears on the data bus 402 (FIG. 19) as it is being written to the packet buffers 412 (FIG. 9) by the source port. Thus, the broadcast or multi-cast packet is "cut-through" to the destination port even if the destination port is busy transmitting another packet. It is expected that this aspect of the present invention will result in a greater number of ports receiving the broadcast or multi-cast packet when it appears on the data bus 402 (FIG. 19) a first time, thereby reducing the total number of times such a packet appears on the data bus 402 (FIG. 19).

A broadcast packet pointer marks a first location of a packet stored in the broadcast packet store 656 while a broadcast loading pointer keeps track of a current location into which a packet is currently being written under control of the broadcast packet controller 650 (FIG. 19). Assuming the entire broadcast or multi-cast packet is successfully stored in the broadcast packet store 656, an appropriate triplet corresponding to the packet is stored in the triplet buffer 460 (FIG. 19) by the controller 650. The triplet includes an indication that the packet is located in the broadcast packet store 656 of the port. Note that the broadcast packet store 656 is preferably reserved for broadcast and multi-cast packets. Thus, the broadcast packet stored 656 preferably does not receive uni-cast packets.

Once the port is available to transmit the packet stored in the broadcast packet store 656, the fetching pointer is initialized to the starting address of the packet and the packet is read from the broadcast packet store 656 and transmitted to the LAN segment associated with the port.

Because broadcast "keep alive" packets are typically smaller than the maximum size IEEE 802.3 packet and occur relatively infrequently in comparison to other types of packets, the principle advantages of this aspect of the present invention can be achieved by sizing the broadcast packet store 656 so as to be capable of storing one entire IEEE 802.3 packet of at least the minimum size. The broadcast packet store 656, can alternately be sized to accommodate an IEEE 802.3 packet of the maximum size or can even be sized to accommodate several packets.

Assuming that the broadcast or multi-cast packet which appears on the data bus 402 (FIG. 9) as it is being loaded into the packet buffers 412 is not successfully stored in the broadcast packet store 656 of the port, then an appropriate triplet corresponding to the packet is stored in the triplet buffer 460. In such case, the triplet includes an indication that the packet is to be retrieved from the packet buffers 412 (FIG. 9). Once the port is available to transmit the packet, the packet is retrieved from the buffers 412 into the transmit packet store 654 from which it is transmitted to the LAN segment associated with the port. Alternately, if it is determined that the broadcast packet was received in error, no triplet is stored in the triplet buffer 460 (FIG. 19) corresponding to such broadcast packet. In either case, the contents of the broadcast packet stored 656 are not utilized and, thus, can be cleared or overwritten.

This aspect of the present invention conserves bandwidth of the bus which interconnects the ports because appearance of the broadcast or multi-cast packet on the bus is minimized.

De-Coupling Table Look-up Operations from Learning Operations

Referring to the multi-port bridge 100 illustrated in FIG. 3, each port 104–112 is coupled to a LAN segment which can include one or more nodes. For each data packet received by the multi-port bridge 100, the look-up table 154 (also referred to as a dynamic filtering database) stored by the memory device 150 is utilized to determine whether the packet is to be filtered (when the source node and the destination node are on a same LAN segment), and if the packet is not to be filtered, to determine which is the appropriate destination port to which the packet is to be directed.

Table 1 shows an example of the look-up table 154, including sample entries, that can be utilized for appropriately filtering and forwarding data packets within the multi-port bridge 100. As shown by Table 1, each entry in the look-up table 154 includes the node address (also referred to as MAC address) for each node of the LAN stored in association with an identification of the port of the multi-port bridge 100 which is coupled to the LAN segment which includes the node. Additional data is stored in the look-up table 154 in association with the node address, such as a time stamp, a VLAN identification, a priority and other associated data.

TABLE 1

| MAC Address (node address) | Port ID | Time Stamp | VLAN ID | Priority | Other Associated Data |
|---|---|---|---|---|---|
| 001123334455 | 4 | 0461 | 4 | 0 | |
| 01A234F111B6 | 15 | 1247 | 0 | 1 | |
| . | . | . | . | . | . |
| . | . | . | . | . | . |
| 0A2C72A8D9 | 8 | 0723 | 3 | 0 | |

So that the look-up table 154 accurately correlates each node address to the appropriate port 104–112 of the multi-port bridge 100 even when nodes are added or removed from the LAN, the look-up table 154 is continuously updated. Preferably, in accordance with the IEEE 802.3 specification, every entry in the look-up table 154 is updated at least every five minutes, and if any node fails to send a packet for five minutes, the entry for that node is deleted from the look-up table 154. In accordance with the IEEE 802.3 standard, each node periodically broadcasts a "keep alive" packet which informs the other nodes of the LAN and the multi-port bridge 100 of the continued presence of the sending node in the LAN. By periodically sending a "keep alive" packet, each node avoids being deleted from the look-up table 154 in the event the node does not transmit another type of packet for five minutes.

As mentioned herein, for each packet received by the multi-port bridge 100, the source port requests a look-up operation from the bus control module 114 by raising an interrupt request line coupled to the bus control module 114. Once the request is granted, the memory control module 118 then updates the look-up tables 154 by ensuring that the source address for the packet is stored in the look-up tables 154 in association with the identification of the source port for the packet (learning operation). In addition, the destination address from each packet received by the multi-port bridge 100 is utilized to look-up the identification of the appropriate destination port for the packet in the look-up table 154 (look-up operation). Then, the identification of the destination port is placed in the triplet (FIG. 5) and the triplet is placed on the communication bus 102 where it is available to the ports of the multi-port bridge 100.

Because the look-up operation identifies the destination port for the packet, the look-up operation is in the critical path of the packet in that it must be completed before the packet can be forwarded to the appropriate destination port. In accordance with the embodiment illustrated in FIG. 3, the learning operation is performed in conjunction with the look-up operation. Thus, the learning operation is placed in the critical path of the packet and must also be completed before the packet can be directed to the appropriate destination port. The result of the learning operation (updating the look-up table 154 ), however, has no effect on the direction of the current packet. Rather, the learning operation is utilized for appropriately directing subsequent packets through the multi-port bridge 100.

In accordance with an aspect of the present invention, learning operations by which a look-up table is updated are performed independently of look-up operations which identify an appropriate destination port for the packet. This allows the learning operations to be removed from the critical path of the packet thereby avoiding delay of the packet's progress caused by performance of such a learning operation.

Figure 21:
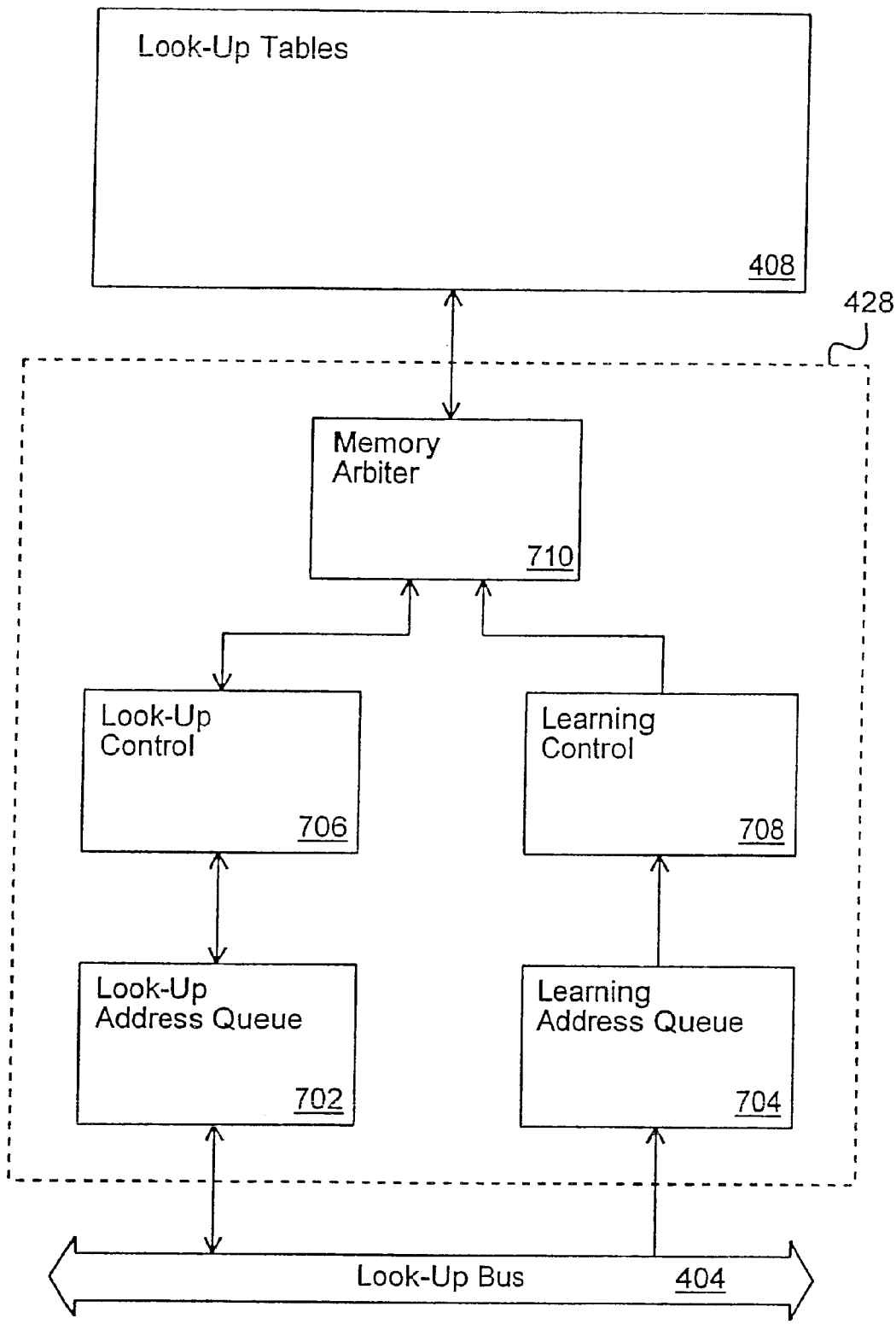
FIG. 21 illustrates a detailed block diagram of a memory controller in accordance with the present invention for de-coupling table look-up operations from learning operations.

FIG. 21 illustrates a detailed block diagram of a memory controller 428 (also shown in FIG. 9) in accordance with the present invention for de-coupling table look-up operations from learning operations. The memory controller 428 includes a look-up address queue 702 and a learning address queue 704 which are each coupled to the look-up bus 404 (also shown in FIG. 9). A look-up controller 706 is coupled to the look-up address queue 702 while a learning controller 708 is coupled to the learning address queue 704. A memory arbiter 710 is coupled to each of the look-up controller 706, the learning controller 708, and the memory device 408 (also shown in FIG. 9). In the preferred embodiment, the look-up address queue 702 and the learning address queue 704 are each implemented as first-in, first-out (FIFO) buffers, while the look-up controller 706, the learning controller 708 and the memory arbiter 710 are each implemented as a finite state machine.

A source port for a packet received by the multi-port bridge 400 (FIG. 9) makes a request for a look-up operation from the look-up bus controller 426 (FIG. 9). When the request is granted, the source port transfers the destination and source addresses for the packet via the look-up bus 404 to the memory controller 428. The destination and source addresses for the packet are simultaneously stored in both the look-up address queue 702 and in the learning address queue 704. When the look-up controller 706 is available for performing a next look-up operation, the destination and source address next in the look-up queue 702 are transferred to the look-up controller 706. The look-up controller 706 then requests permission to access the memory device 408 from the memory arbiter 710. Upon being granted access to the memory 408, the look-up controller 706 accesses the look-up table for determining whether the received packet is to be filtered, or if not filtered, to identify the appropriate destination port for the packet (look-up operation). The results of the look-up operation (e.g. a triplet) are then returned to the look-up bus 404 where they are available to the source port and the appropriate destination port for appropriately directing the packet through the multi-port bridge 400 (FIG. 9).

Similarly, when the learning controller 708 is available for performing a next learning operation, the destination and source address next in the learning queue 704 are transferred to the learning controller 708. The learning controller 708 then requests permission to access the memory device 408 from the memory arbiter 710. Upon being granted access to the memory 408, the learning controller 706 updates the look-up table (learning operation).

In the preferred embodiment, the memory arbiter 710 grants the look-up controller 706 a higher priority for accessing the memory 408 relative to the learning controller 708. Thus, look-up operations are given precedence over learning operations. For example, when several packets are received by the multi-port bridge 400 and queued for look-up and learning operations, the look-up operations can be performed first, while the learning operations are delayed until after all the queued look-up operations have been completed. Alternately, a learning operation can be performed for each packet after a look-up operation for the packet has been completed and while the results of the look-up operation are being returned via the look-up bus 404.

Thus, according to this aspect of the present invention, the results of the look-up operation for an incoming packet are available without first having to wait for a learning operation to be performed for the packet.

Statistical Learning Technique

A conventional technique for updating a look-up table in a multi-port bridge is to execute a learning operation for every packet received by the multi-port bridge. During such a learning operation, an entry is stored in the look-up table which includes the source address (node address) from the packet in association with the identification of the source port for the packet. In addition, a time stamp is stored with the entry such that the age of the entry can be determined later for deleting stale entries. If an entry already exists for a particular node, the time stamp is simply updated.

When a learning operation is performed for every packet received by the multi-port bridge, as is the case for such a conventional technique, this can result in the performance of a significant number of redundant operations which merely confirm information that has already been obtained. For example, when data packets are communicated between nodes of a multi-port bridge, they are typically communicated as part of a session consisting of many packets being sent between the same nodes during a relatively short time period. Thus, the time stamp for an entry in the look-up table may be updated many times within a five minute interval. To the prevent the entry from being deleted, however, the time stamp need only be updated once during each five minute interval. Thus, conventional techniques can result in the needless performance of redundant learning operations.

In accordance with an aspect of the present invention, a learning operation is not performed for every packet received by the multi-port bridge 400 (FIG. 9). Instead, a learning operation is performed only for selected packets received by the multi-port bridge 400 so as to minimize the number of redundant operations performed. This minimizes the need to preoccupy the memory device 408 (FIG. 9) with interactions required for performing learning operations and, thus, increases the availability of the memory device 408 for performing look-up operations. A look-up operation, which identifies an appropriate destination port for a packet received by the multi-port bridge 400 is, however, preferably performed for every packet received by the multi-port bridge 400.

Figure 22:
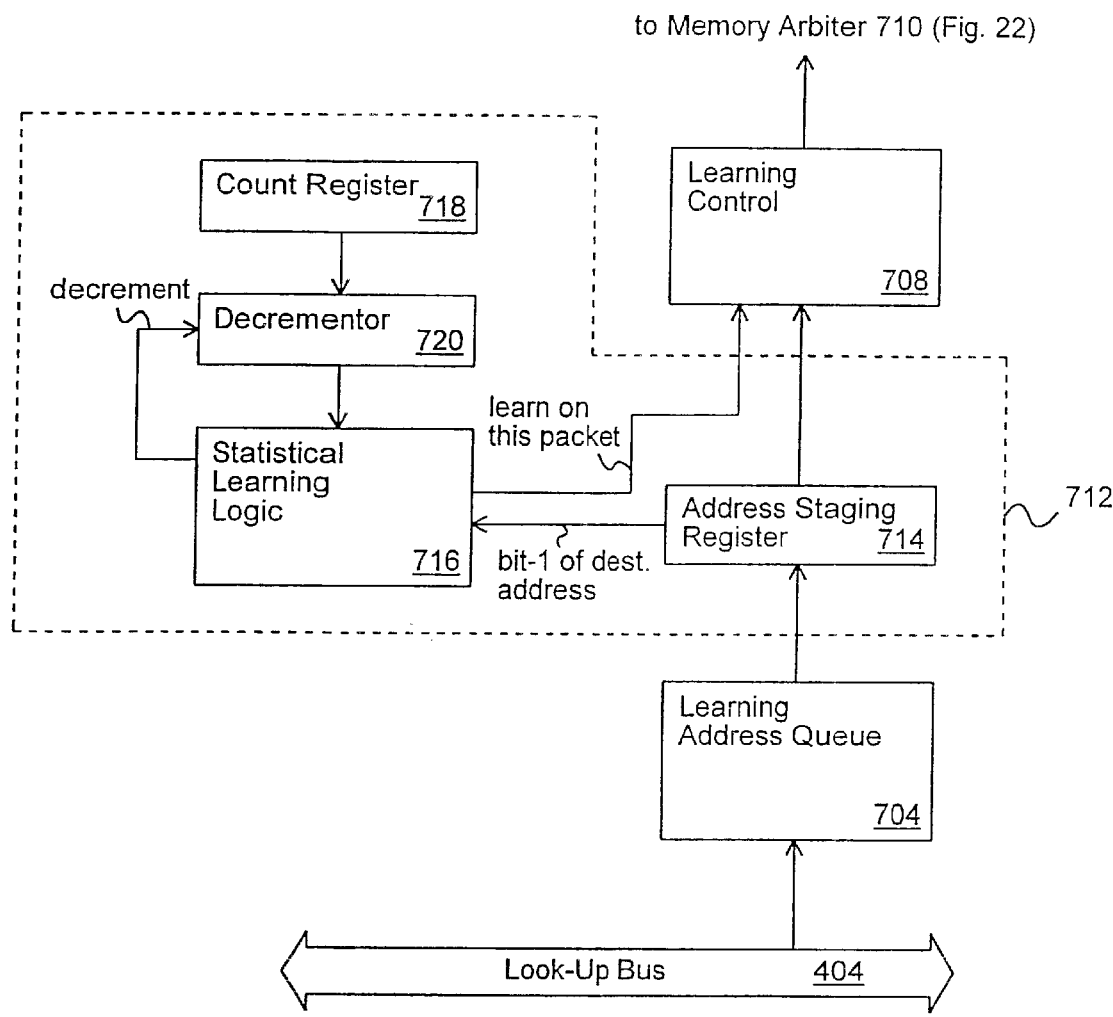
FIG. 22 illustrates a statistical learning controller in accordance with the present invention.

FIG. 22 illustrates a statistical learning controller 712 in accordance with the present invention. In the preferred embodiment, the statistical learning controller 712 forms a portion of the memory controller 428 (FIGS. 9, 21 ) and is coupled between the learning address queue 704 (FIGS. 21–22 ) and the learning controller 708 (FIGS. 21–22 ). The statistical learning controller 712 includes an address staging register 714 coupled to the learning address queue 704. When the destination and source addresses for an incoming data packet are received by the multi-port bridge 400 (FIG. 9), the source port requests access to the look-up bus 404 (FIGS. 9, 22 ) from the bus controller 426 (FIG. 9). Once access to the look-up bus 404 is granted, the source port transfers the destination and source addresses for the packet into the learning address queue 704.

When the address staging register 714 is available to accept a next entry, a destination address for a next packet stored in the learning queue 714 is transferred from the learning queue 704 into the address staging register 714. Statistical learning logic 716 is coupled to the address staging register 714. The first bit of the destination address stored in the address staging register 714 is passed to the statistical learning logic 716. If the first bit is a logic one, then this indicates that the packet is a broadcast packet, such as a "keep alive" packet, or a multi-cast packet. If the first bit is a logic zero, then this indicates that the packet is a uni-cast packet.

The learning controller 708 (FIGS. 21–22) is coupled to the address staging register 714 and to the statistical learning logic 716. In the preferred embodiment, if the statistical learning logic 716 determines that the first bit is a logic one (the current packet is a broadcast or multi-cast packet), then the statistical learning logic 716 instructs the learning controller 708 to update the look-up table based upon the current packet whose destination address is stored in the address staging register 714 and whose source address is stored in the learning address queue 704. The destination and source address are then transferred to the learning controller 708 for updating the look-up table. The learning controller 708 is also coupled to the memory arbiter 710 (FIG. 21) for requesting access to the memory 408 (FIGS. 9, 21). When such a request is granted by the memory arbiter 710, the learning controller 708 updates the look-up table stored in the memory 408 (learning). A next destination address is then transferred from the learning address queue 704 into the staging address register 714.

A count register 718 is preconditioned to store a count (m−1) of uni-cast packets that are to be received prior to performing a learning operation on a next uni-cast packet. Thus, only every (m)th uni-cast packet is utilized for updating the look-up table. In the preferred embodiment, every sixteenth uni-cast packet is utilized for updating the look-up table. The count register 718 is coupled to initialize a decrementor 720 with the count (m−1). The decrementor 720 receives a decrement input from the statistical learning logic 716 which instructs the decrementor 720 to decrement the count by one. The decrementor provides a current count to the statistical learning logic 716.

Assuming the first bit of the destination address indicates that the packet is a uni-cast packet, the statistical learning logic 716 reads the current count from the decrementor 720. If the count is one or more, the current packet is ignored in regard to learning operations and the statistical learning logic instructs the decrementor 720 to decrement the current count by one. A next destination address is then transferred to the address staging register 714 from the learning queue 704. Upon receiving a (m−1)th uni-cast packet without the multi-port bridge 400 having performed a learning operation on a uni-cast packet, the current count reaches zero.

Then, upon receiving a next uni-cast packet, the statistical learning logic 716 instructs the learning controller 708 to perform a learning operation. The destination and source addresses for the packet are transferred to the learning controller 708 for this purpose. The decrementor 720 is then re-initialized with the count (m−1) from the count register 718. Then, a next destination and source address is transferred from the destination and source address queue into the address staging register 714. This process continues for each packet received by the multi-port bridge 400.

In this way, learning is performed for every broadcast and multi-cast packet and for every (m)th uni-cast packet. By updating the look-up table for every broadcast packet, each "keep alive" packet is utilized for updating the look-up table. This ensures that entries in the look-up table for nodes which have not transmitted other types of data packets within the last five minutes, but which are still present in the LAN, are not erroneously deleted from the look-up table. By also updating the look-up table upon every (m)th uni-cast packet, entries in the look-up table for nodes which are engaging in a communication session will be ensured to be current, even if a "keep alive" packet for such a node was not correctly received within the previous five minutes.

It will be apparent that modifications can be made while achieving the principle advantages of this aspect of the present invention. For example, the frequency with which learning operations are performed can be made relatively high upon powering on the multi-port bridge 400 and, then, reduced after the look-up table is substantially complete. Accordingly, a learning operation can be performed for every packet received upon power-on and, after a few minutes of operation, learning can be reduced to every (m)th uni-cast packet. Alternately, learning operations can be eliminated for uni-cast packets and performed only for broadcast and multi-cast packets.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A method of optimizing a data path in a multi-port bridge for a local area network (LAN) comprising a plurality of segments, wherein the method comprises:

a. identifying a data path through the multi-port bridge wherein the data path includes a plurality of stages arranged in serial, wherein each stage performs a corresponding operation on data received from a sending segment of the LAN by the multi-port bridge prior to transmission of the data to a receiving segment of the LAN by the multi-port bridge, and further wherein the identified data path is a receive data path by which packets are received from the sending segment of the LAN by a port of the multi-port bridge and stored in a packet buffer included in the multi-port bridge;

b. identifying a stage in the data path wherein the identified stage requires a period of time to perform its corresponding operation which is longer than a period of time required by any other stage in the receive data path; and c. subdividing the identified stage into two or more subdivided stages wherein each of the subdivided stages performs a corresponding operation and wherein the operations performed by the subdivided stages collectively perform the operation associated with the identified stage and wherein each of the two or more subdivided stages requires a corresponding period of time to perform its corresponding operation which is shorter than the period of time required for the identified stage to perform its corresponding operation.

2. The method according to claim 1 further comprising repeating identifying a stage and subdividing the stage.

3. A method of optimizing a data path in a multi-port bridge for a local area network (LAN) comprising a plurality of segments, wherein the method comprises:

a. identifying a data path through the multi-port bridge wherein the data path includes a plurality of stages arranged in serial, wherein each stage performs a corresponding operation on data received from a sending segment of the LAN by the multi-port bridge prior to transmission of the data to a receiving segment of the LAN by the multi-port bridge, and further wherein the identified data path is a transmit data path by which packets are retrieved from a packet buffer included in the multi-port bridge and transmitted to the receiving segment of the LAN;

b. identifying a stage in the data path wherein the identified stage requires a period of time to perform its corresponding operation which is longer than a period of time required by any other stage in the transmit data path; and c. subdividing the identified stage into two or more subdivided stages wherein each of the subdivided stages performs a corresponding operation and wherein the operations performed by the subdivided stages collectively perform the operation associated with the identified stage and wherein each of the two or more subdivided stages requires a corresponding period of time to perform its corresponding operation which is shorter than the period of time required for the identified stage to perform its corresponding operation.

4. The method according to claim 3 further comprising repeating identifying a stage and subdividing the stage.

5. A method of optimizing a data path in a multi-port bridge for a local area network (LAN) comprising a plurality of segments, wherein the method comprises:

a. identifying a data path through the multi-port bridge wherein the data path includes a plurality of stages arranged in serial, wherein each stage performs a corresponding operation on data received from a sending segment of the LAN by the multi-port bridge prior to transmission of the data to a receiving segment of the LAN by the multi-port bridge;

b. identifying a stage in the data path wherein the identified stage requires a period of time to perform its corresponding operation which is longer than any other stage in the data path; and c. subdividing the identified stage into two or more subdivided stages wherein each of the subdivided stages performs a corresponding operation and wherein the operations performed by the subdivided stages collectively perform the operation associated with the identified stage and wherein each of the two or more subdivided stages requires a corresponding period of time to perform its corresponding operation which is shorter than the period of time required for the identified stage to perform its corresponding operation.

6. The method according to claim 5 further comprising:

a. determining a bandwidth for the multi-port bridge by summing a throughput capacity of each of a plurality of ports of the multi-port bridge; and b. determining a frequency for a clock signal based upon the bandwidth and a width of the data bus wherein data traverses the data bus according to the clock signal.

7. The method according to claim 6 further comprising repeating identifying a stage and subdividing the stage until a slowest stage in the data path is operable according to the clock signal.

8. The method according to claim 7 further comprising applying the clock signal to the serial data path wherein data progresses through the serial data path according to the clock signal.

* * * * *

UNITED STATES PATENT AND TRADEMARK OFFICE
CERTIFICATE OF CORRECTION

PATENT NO. : 6,744,728 B1
DATED : June 1, 2004
INVENTOR(S) : David Chung

It is certified that error appears in the above-identified patent and that said Letters Patent is hereby corrected as shown below:

Title page,
Item [73], Assignee, delete "Sony Corporation & Sony" and insert -- Sony Corporation, Tokyo (JP) & Sony --.
Item [56], References Cited, U.S. PATENT DOCUMENTS, add
-- 5,337,309 A  8/1994  Faulk, Jr. ……... 370/60 --.
OTHER PUBLICATIONS, add -- William Stallings, "Internetworking: A Guide for the Perplexed," Telecommunications, North American Edition, Sept. 1989, pp. 25-30. --.

Column 11,
Line 26, delete "32 bits 30 MHz" and insert -- 32 bits = 30 MHz --.

Column 12,
Line 65, delete "Time @(1 Gbps" and insert -- Time @ 1 Gbps --.

Column 18,
Line 36, delete "402cand Port" and insert -- 402c and Port --.

Column 19,
Line 10, delete "554cand" and insert -- 554c and --.
Line 39, delete "420cand 402d," and insert -- 402c and 402d, --.

Column 26,
Line 67, delete "table 154 )," and insert -- table 154), --.

Signed and Sealed this

Twenty-eighth Day of December, 2004

JON W. DUDAS
*Director of the United States Patent and Trademark Office*